United States Patent
Hirano et al.

(10) Patent No.: US 6,611,294 B1
(45) Date of Patent: Aug. 26, 2003

(54) METHOD AND DEVICE FOR CONVERTING NUMBER OF FRAMES OF IMAGE SIGNALS

(75) Inventors: Yasuhiro Hirano, Hachioji (JP); Kazuo Ishikura, Yokohama (JP); Masato Sugiyama, Yokohama (JP); Mitsuo Nakajima, Yokohama (JP); Yasutaka Tsuru, Yokohama (JP); Takaaki Matono, Yokohama (JP); Haruki Takata, Yokohama (JP); Takashi Kanehachi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/720,327
(22) PCT Filed: Jun. 25, 1998
(86) PCT No.: PCT/JP98/02848
§ 371 (c)(1),
(2), (4) Date: Dec. 22, 2000
(87) PCT Pub. No.: WO99/67952
PCT Pub. Date: Dec. 29, 1999

(51) Int. Cl.[7] ................................................. H04N 7/01
(52) U.S. Cl. ........................ 348/459; 348/452; 348/455; 348/700; 348/699
(58) Field of Search ................................. 348/459, 441, 348/448, 452, 451, 453, 455, 700, 699, 701; H04N 7/01, 11/20, 5/14

(56) References Cited

U.S. PATENT DOCUMENTS 5,761,398 A * 6/1998 Legall .................... 358/1.15
6,509,930 B1 * 1/2003 Hirano et al. ............ 348/452

FOREIGN PATENT DOCUMENTS

| JP | 63313982 | * | 12/1988 |
| JP | 6014305 | * | 1/1994 |
| JP | 6506578 | * | 7/1994 |
| JP | 095593 | * | 4/1995 |
| JP | 7099651 | * | 4/1995 |
| JP | 7170496 | * | 7/1995 |
| JP | 8322019 | * | 12/1996 |

OTHER PUBLICATIONS

Journal of Electronics Imaging, vol. 4, No. 3, Jul. 1, 1995, Martin Harn "Hardware Implementation of a Motion–Conpensating Format Converter", pp. 270–277.*

* cited by examiner

Primary Examiner—Sherrie Hsia
(74) Attorney, Agent, or Firm—Antonelli, Terry, Stout & Kraus, LLP

(57) ABSTRACT

The present invention provides a movement correction frame count transformation apparatus for carrying out frame count transformation processing on a picture signal. In the apparatus, an input picture signal (S1) of interlaced scanning is converted into a signal (S2) of sequential scanning by an IP conversion unit (1). A movement detecting unit (3) detects movement detection signals (MD1 and MD2). A block unit movement vector searching unit (4) detects a block unit movement vector (BMV) by carrying out block matching processing. A movement vector correcting unit (5) carries out miniblock division processing to generate a movement vector (BV) if a movement correction error is equal to or greater than a threshold value. A pixel unit movement vector generating unit (6) generates a movement vector with a smallest error component between a frame signal of a current frame and a frame signal of an immediately preceding frame as a movement vector of a pixel. An MC interpolation frame signal generating unit (7) generates an interpolation frame in movement correction processing carried out by a median filter in order to produce a signal (S4) of sequential scanning as a result of frame count transformation based on movement correction.

20 Claims, 14 Drawing Sheets

FIG. 5

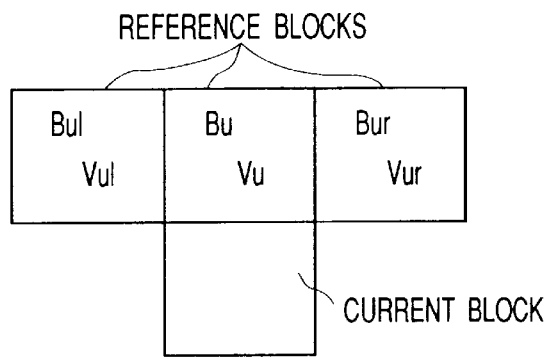

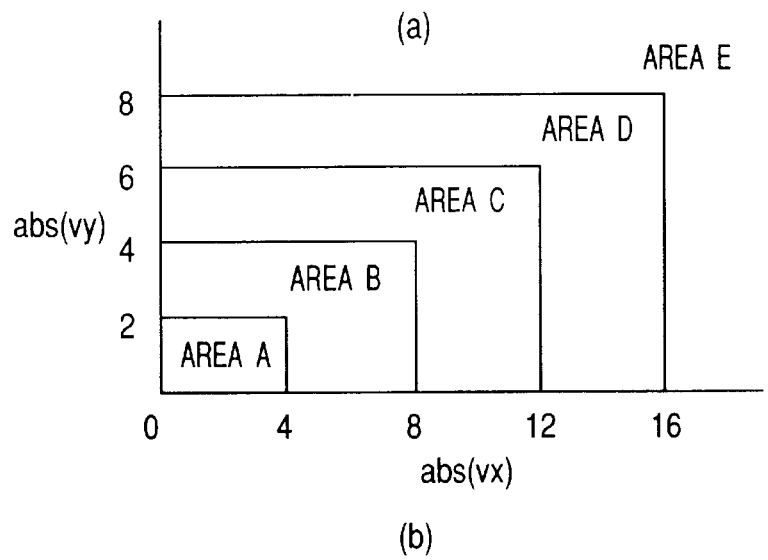

(b)

| SEARCH MODE | SET CONDITION | SEARCH PROCESSING |
|---|---|---|
| MOD1 | AREA A=100% | HORIZONTAL RANGE OF ± 4 PIXELS AND VERTICAL RANGE OF ± 2 LINES. COMPLETE SEARCH |
| MOD2 | AREA A>95% | HORIZONTAL RANGE OF ± 8 PIXELS AND VERTICAL RANGE OF ± 4 LINES. COMPLETE SEARCH |
| MOD3 | AREA A+B>95% | HORIZONTAL RANGE OF ± 12 PIXELS AND VERTICAL RANGE OF ± 6 LINES. REPRESENTATIVE POINT SEARCH * |
| MOD4 | AREA A+B+C>95% | HORIZONTAL RANGE OF ± 16 PIXELS AND VERTICAL RANGE OF ± 8 LINES. REPRESENTATIVE POINT SEARCH * |
| MOD5 | AREA A+B+C+D>95% | HORIZONTAL RANGE OF ± 24 PIXELS AND VERTICAL RANGE OF ± 12 LINES. REPRESENTATIVE POINT SEARCH + |

* : DENSE AREA (dx=2, dy=2)   + : DOUBLE AREA LAYOUT OR REPRESENTATIVE POINTS COMPOSED OF DENSE AND SPARSE AREAS

SEARCH AREA (HORIZONTAL RANGE OF MX PIXELS AND VERTICAL RANGE OF MY LINES WHERE MX>MY)
DISTANCE BETWEEN 2 ADJACENT REPRESENTATIVE POINTS: DENSE AREA: dx=2 PIXELS AND dy=2 LINES
SPARSE AREA: dx=4 PIXELS AND dy=4 LINES

FIG. 9

1st STEP

COMPUTE A MOVEMENT CORRECTION ERROR BY USING THE MOVEMENT VECTOR BMV AND COMPARE THE ERROR WITH A THRESHOLD VALUE TH

2nd STEP

EQUAL TO OR GREATER THAN THE THRESHOLD VALUE:
PERFORM CORRECTION PROCESSING BY DIVIDING EACH BLOCK INTO MINIBLOCKS EACH HAVING A HIRIZONTAL WIDTH OF MBX AND A VERTICAL HEIGHT OF MBY AND SELECT A MOVEMENT VECTOR AMONG THOSE OF ADJACENT BLOCKS WITH A SMALLEST MOVEMENT CORRECTION ERROR COMPUTED FOR THE MINIBLOCKS AS A MOVEMENT VECTOR BV OF THE MINIBLOCKS

SMALLER THAN THE THRESHOLD VALUE:
PERFORM NO CORRECTION PROCESSING AND ASSIGN THE MOVEMENT VECTOR BMV TO THE MINIBLOCKS

FIG. 10

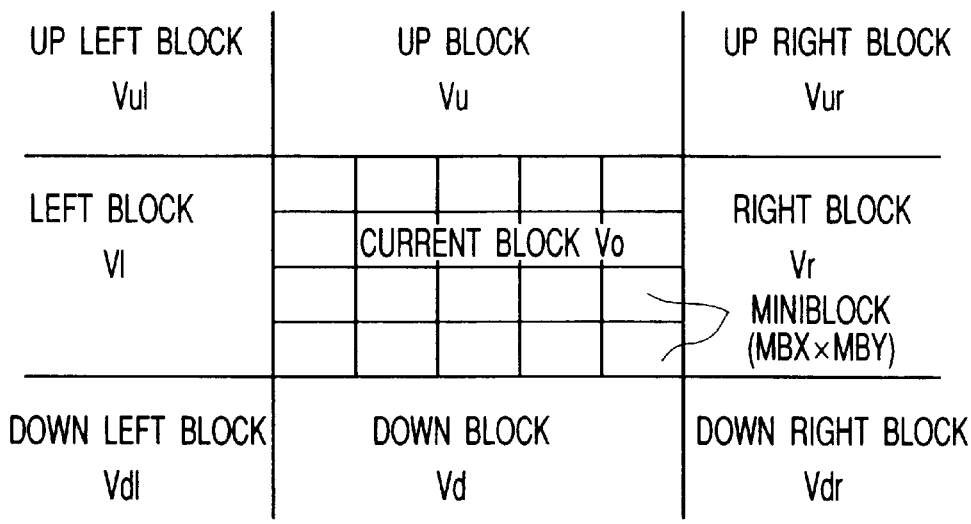

$BV = MIN\{\Sigma | fct(x, y) - fpr(x - Vx, y - Vy) | \}$ (a)

(b)

| CT4 | ER1,···,ER6 | SL |
|---|---|---|
| MC=0 | ER1<th | Smc |
|  | ER1≧th and MIN=ER2 | Spr |
|  | ER1≧th and MIN=ER3 | Sct |
|  | ER1≧th and MIN=ER4 | Stf |
|  | ER1≧th and MIN=ER5 | S3 |
|  | ER1≧th and MIN=ER6 | S2 |
| MC=1 |  | S2 |

METHOD AND DEVICE FOR CONVERTING NUMBER OF FRAMES OF IMAGE SIGNALS

TECHNICAL FIELD

In general, the present invention relates to a frame count transformation method and a frame count transformation apparatus of a picture signal. More particularly, the present invention relates to a frame count transformation method of a picture signal and a frame count transformation apparatus adopting the method which are properly applicable to transformation of the number of frames of the picture signal by special signal processing such as movement correction.

BACKGROUND ART

With the development of multimedia technologies going on in recent years, it becomes necessary to provide the television receiver with a function for displaying a variety of signals with different picture formats such as television signals and PC picture signals of various systems. As a function to keep up with an increasing demand for high quality pictures and plain surface displays, a picture display function based on sequential scanning is required. In order to implement these functions, special signal processing such as frame count transformation to convert a variety of input signals into a format of a picture display unit and the sequential scanning is required.

With regard to the frame count transformation, there are provided simple signal processing methods such as frame repetition and frame dropping. However, these methods cause picture quality deterioration such as the so-called motion judder disturbance whereby the smooth motion of a moving picture is lost.

A frame count transformation method of a movement correction type has been introduced to eliminate such disturbances. With this method, the positions of pictures of the preceding and succeeding frames are moved by a movement vector in order to generate a signal of an interpolation frame. With regard to the method and the configuration of such signal processing, a number of proposals have been made. For example, in Japanese Patent Laid-open No. Hei-7-170496, there is disclosed a technology to efficiently search for a movement vector. In addition, in Japanese Patent Laid-open No. Hei-7-336650, there is disclosed a technology for preventing degradation such as resolution deterioration at edges of a moving picture which is inherent in movement correction.

In the conventional technology disclosed in Japanese Patent Laid-open No. Hei-7-170496, however, the precision of the movement detection is an issue while, in the technology disclosed in Japanese Patent Laid-open No. Hei-7-336650, the complexity of the signal processing is an issue. These issues become a big problem encountered in the implementation of a high-quality and low-cost frame count transformation apparatus.

It is thus an object of the present invention to provide a movement correction frame count transformation method and a movement correction frame count transformation apparatus of a picture signal that are capable of implementing signal processing to convert the number of frames of the picture signal with a high degree of quality and at a low cost.

DISCLOSURE OF INVENTION

The frame count transformation method provided by the present invention comprises the steps of:
  detecting movement of a picture signal and searching for a block unit movement vector;
  correcting the block unit movement vector in dependence on the magnitude of a movement correction error component of the block unit movement vector;
  generating a movement vector selected on the basis of an error component between a movement correction signal of a current frame and a movement correction signal of an immediately preceding frame calculated by using the corrected block unit movement vector as a pixel unit movement vector;
  generating a movement correction interpolation frame signal in dependence on the magnitude of an error component between a movement correction signal of a current frame and a movement correction signal of an immediately preceding frame calculated by using the pixel unit movement vector; and using the movement correction interpolation frame signal for carrying out conversion of the number of frames of a picture signal.

In addition, the frame count transformation apparatus provided by the present invention comprises:
  a block unit movement vector searching unit for detecting movement of a picture signal and searching for a block unit movement vector;
  a movement vector correcting unit for correcting the block unit movement vector in dependence on the magnitude of a movement correction error component of the block unit movement vector;
  a pixel unit movement vector generating unit for generating a movement vector selected on the basis of an error component between a movement correction signal of a current frame and a movement correction signal of an immediately preceding frame calculated by using the corrected block unit movement vector as a pixel unit movement vector; and
  a movement correction interpolation frame signal generating unit for generating a movement correction interpolation frame signal in dependence on the magnitude of an error component between a movement correction signal of a current frame and a movement correction signal of an immediately preceding frame calculated by using the pixel unit movement vector.

To put it concretely, in the present invention, the following technological means are used. To be more specific, in order to substantially reduce the amount of processing, in a search of movement vectors required in the transformation of the number of frames of a picture signal, signal processing is carried out at 3 stages, namely, a search for a block unit movement vector, correction of the block unit movement vector and generation of a pixel unit movement vector.

First of all, in the search for a block unit movement vector, preprocessing is carried out to distinguish a static picture block from a moving picture block. A static picture block is a block in which movement is not detected by a frame differential signal. On the other hand, a dynamic block is a block in which movement is detected by a frame differential signal. Only a moving picture block is subjected to one of the following 3 kinds of search processing.

[1] Reference vector search processing: Movement vectors of blocks adjacent to the current block are taken as reference vectors. A specific reference vector, for which a predicted error component is smallest among the reference vectors and is smaller than a threshold value, is identified and an area in close proximity to this specific reference vector is subjected to block matching processing in order to detect a movement vector of a block unit.

[2] Movement vector distribution adaptive search processing: In the case of a reference vector with a predicted error component equal to or greater than the threshold value, on the other hand, a movement vector of a block unit is detected by carrying out block matching processing in accordance with a search mode which is determined in dependence on a frequency of generation of movement vectors in an immediately preceding frame. To put in detail, a search area and a layout of representative movement vectors in the block matching area are changed depending on the search mode.

[3] Converted vector search processing: Movement vectors per frame generated in vector conversion processing from movement vector information used in a picture encoding process are taken as reference movement vectors and a reference movement vector with a smallest predicted error component is detected as a movement vector of a block unit.

Subsequently, in the correction of the block unit movement vector, the detected block unit movement vector with a predicted error component equal to or greater than a threshold value is divided into miniblocks in the horizontal and vertical directions. Then, correction is made by carrying out miniblock division search wherein one of movement vectors of a current block and blocks adjacent to the current block with a smallest predicted error component computed for the associated miniblocks is selected as a movement vector of the miniblocks.

Then, in the generation of a pixel unit movement vector, one of movement vectors of a current block and blocks adjacent to the current block with a smallest absolute value of a differential component between signals of current and immediately preceding frames completing movement correction processing is generated as a movement vector of a pixel.

According to the movement vector search provided by the present invention as described above, the amount of processing can be reduced by an order of 2 to 3 digits in comparison with the complete search, allowing an accurate movement vector to be detected.

Finally, in generation of a movement correction (MC) interpolation frame signal, one of interpolation signals having a plurality of types is generated as a movement correction interpolation frame signal by using a median filter for selecting an interpolation signal with a smallest movement correction error as the movement correction interpolation frame signal.

To put it in detail, a differential signal component between a movement correction immediately preceding frame signal generated by moving the position of a picture of an immediately preceding frame by a movement correction vector and a movement correction current frame signal generated by moving the position of a picture of a current frame by a movement correction vector is calculated. If the differential signal component is smaller than a threshold value, an average value of the movement correction immediately preceding frame signal and the movement correction current frame signal is output as the movement correction interpolation frame signal. If the differential signal component is equal to or greater than the threshold value, on the other hand, one of the movement correction immediately preceding frame signal, the movement correction current frame signal, an immediately preceding frame signal, a current frame signal and a linear interpolation signal between the immediately preceding and current frame signals with a smallest error performance function is selected and output as the movement correction interpolation frame signal.

In addition, the frequency of generation of movement vectors detected in the movement vector search is measured in order to detect a frame including a picture moving at a speed at which it is easy for a motion judder disturbance to become conspicuous. Then, moving speed adaptive movement correction processing is carried out to generate a movement correction interpolation frame signal only for the detected frame.

By generating an MC interpolation frame signal in accordance with the present invention as described above, the amount of deterioration of the picture quality inherent in movement correction processing such as isolated point deterioration caused by replacement of a part of a picture with an inappropriate picture and deterioration caused by movement seen unnaturally due to flickering of an edge of a moving picture can be reduced substantially, allowing the quality of the picture to be improved.

In addition, according to the present invention, in an area where a scene changes, processing to search movement vectors and processing to generate a movement correction interpolation frame signal are halted. As a result, it is possible to prevent an extremely large amount of processing from resulting in such area where a scene changes.

The technological means provided by the present invention as described above allow a movement correction frame count transformation method and a high quality movement correction frame count transformation apparatus adopting the method for transforming the number of frames of a picture signal to be provided at a low cost.

In addition, the present invention also provides an information handling home apparatus comprising:

an input unit for inputting a picture signal;

a frame count transformation unit for carrying out transformation processing on the number of frames of said picture signal by adoption of a frame count transformation method comprising:

detecting movement of a picture signal and searching for a block unit movement vector;

correcting said block unit movement vector in dependence on the magnitude of a movement correction error component of said block unit movement vector;

generating a movement vector selected on the basis of an error component between a movement correction signal of a current frame and a movement correction signal of an immediately preceding frame calculated by using said corrected block unit movement vector as a pixel unit movement vector; and generating a movement correction interpolation frame signal in dependence on the magnitude of an error component between a movement correction signal of a current frame and a movement correction signal of an immediately preceding frame calculated by using said pixel unit movement vector; and a display unit for displaying an output of said frame count transformation unit.

As a result, it is possible to implement information handling home equipment such as a high quality television receiver capable of keeping up with multi-source signals, a DVD player, a personal computer and a PAD terminal at a low cost.

BRIEF DESCRIPTION OF DRAWINGS

Embodiments of the present invention will be described with reference to the following diagrams wherein:

FIG. 5 is a diagram showing typical areas of movement vectors of reference blocks;

FIG. 6(a) is a diagram showing areas each for measuring a frequency at which a movement vector is generated and FIG. 6(b) shows a table showing typical characteristics of a set condition and search processing for different search modes;

FIG. 9 is a diagram showing a flowchart representing signal processing carried out by the movement vector correcting unit;

FIG. 10 is a diagram showing operations of miniblock division and movement vector correction in a simple and plain manner;

FIG. 16(a) is a diagram showing a relation between reference pixels and an object pixel whereas FIG. 16(b) is a diagram showing operations carried out by a judgment unit in a simple and plain manner;

BEST MODE FOR CARRYING OUT THE INVENTION

The present invention will become apparent from a careful study of the following detailed description of some preferred embodiments with reference to the accompanying diagrams. The description begins with an explanation of a first embodiment of the present invention with reference to FIGS. 1 to 16.

Figure 1:
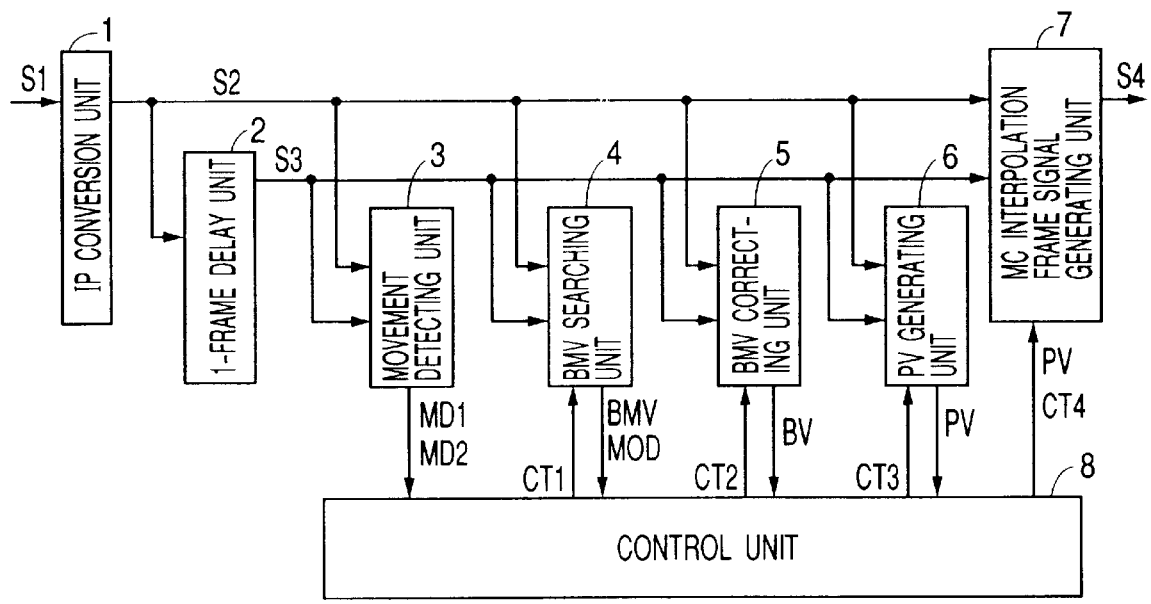
FIG. 1 is a block diagram showing the configuration of a 1st embodiment of the present invention.

FIG. 1 is a block diagram showing the configuration of a frame count transformation apparatus implemented by the first embodiment of the present invention. As shown in the figure, the frame count transformation apparatus provided by the present invention comprises an IP conversion unit 1, a 1-frame delay unit 2, a movement detecting unit 3, a block unit movement vector searching unit 4, a movement vector correcting unit 5, a pixel unit movement vector generating unit 6, an MC (Movement Correction) interpolation frame signal generating unit 7 and a control unit 8.

An input picture signal S1 (comprising luminance and chrominance signal components) of interlaced scanning is supplied to the IP conversion unit 1 for carrying out scanning conversion signal processing, that is conversion from interlaced scanning to sequential scanning, to convert the input picture signal S1 into a signal series S2 (also comprising luminance and chrominance signal components) of sequential scanning.

The 1-frame delay unit 2 is used for delaying a picture signal by 1 frame along the time axis. Thus, when the signal series S2 is supplied thereto, a signal series S3 of the immediately preceding frame is output.

The movement detecting unit 3 carries out processing to find a difference in luminance signal component between the signal series S2 of the current frame and the signal series S3 of the immediately preceding frame, extracting a differential signal between the 2 frames. The differential signal is subjected to a binary quantization process to produce movement detection signals MD1 and MD2 which are supplied to the control unit 8.

The block unit movement vector searching unit 4 is used for detecting a movement vector for each block which has a typical size of 16 pixels×16 lines or 8 pixels×8 lines. To put it in detail, a control signal CT1 output by the control unit 8 includes the movement detection signal MD1. A block with a movement detection signal MD1 of 0 is judged to be a static picture block for which a block unit movement vector BMV set at 0 is output. On the other hand, a block with a movement detection signal MD1 of 1 is judged to be a moving picture block. In this case, the movement vector distribution adaptive search processing or the reference vector search processing described earlier is carried out for the luminance signal components or both the luminance and chrominance signal components of the signals S2 and S3 to detect a block unit movement vector BMV.

A block with a predicted error component of the luminance signal component or both the luminance and chrominance signal components exceeding a threshold value is divided in the horizontal and vertical directions into miniblocks which each have a typical size of 2 pixels×2 lines. The movement vector correcting unit 5 makes correction by carrying out a miniblock division search wherein one of movement vectors of the current block and blocks adjacent to the current block with a smallest predicted error component computed for the associated miniblocks is taken as a movement vector of the miniblocks. The correction based on the miniblock division search results in a corrected movement vector BV.

The pixel unit movement vector generating unit 6 outputs one of movement vectors of the current block and blocks adjacent to the current block with a smallest absolute differential component between the luminance signal components or both the luminance and chrominance signal components of signals of the immediately preceding frame and the current frame completing movement correction processing as a pixel unit movement vector PV.

The MC (Movement Correction) interpolation frame signal generating unit 7 selects one of complementary signals of a plurality of kinds with a smallest movement correction error in order to generate a picture signal series S4 (comprising luminance and chrominance signal components) of sequential scanning with a frame frequency thereof increased in the movement correction frame count transformation processing. One of the complementary signals which are generated with the pixel unit movement vector PV used as a base is selected by a median filter configuration employed in the MC interpolation frame signal generating unit 7 as will be described later.

The control unit 8 outputs control signals CT1 to CT4 required in the operations described above to the other components.

The explanation of the above diagram showing the overall configuration is completed. Configurations of main blocks composing the embodiment are described as follows.

Figure 2:
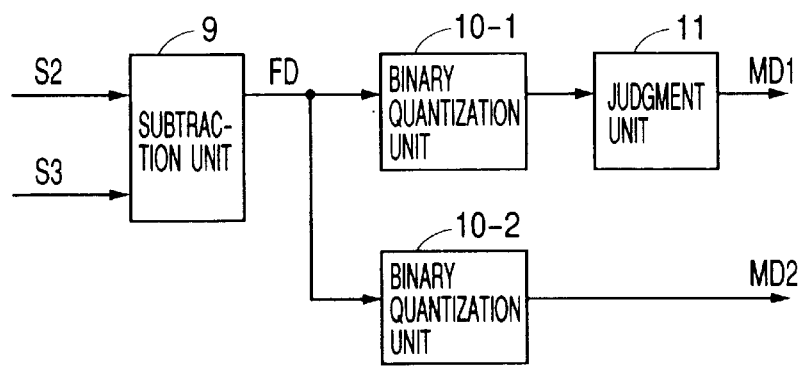
FIG. 2 is a block diagram showing a typical configuration of a movement detecting unit.

FIG. 2 is a block diagram showing a typical configuration of the movement detecting unit 3. A subtracting unit 9 shown in the figure carries out processing to find a difference in luminance signal component between the signal series S2 of the current frame and the signal series S3 of the immediately preceding frame, extracting a differential signal component FD between the 2 successive frames.

A binary quantization unit 10-1 judges the frames to be frames of a static picture and outputs a binary signal of 0 if the level of the differential signal component FD is within the range ±Tha where notation Tha is a predetermined set value, or judges the frames to be frames of a moving picture and outputs a binary signal of 1 if FD exceeds the range ±Tha. A static block judging unit 11 detects the values of the binary signals for a block. If all binary signals are found to have a value of 0 for a block, the block is judged to be a static picture block. In this case, the movement detection signal MD1 is set at 0. In other cases, the block is judged to be a moving picture block and the movement detection signal MD1 is set at 1.

A binary quantization unit 10-2 judges the frames to be frames of a static picture and outputs a movement detection signal MD2 set at 0 if the level of the differential signal component FD is 0, or judges the frames to be frames of a moving picture and outputs a signal MD2 set at 1 in other cases.

Next, a typical configuration of the block unit movement vector searching unit 4 is explained by referring to FIGS. 3 to 7.

Figure 3:
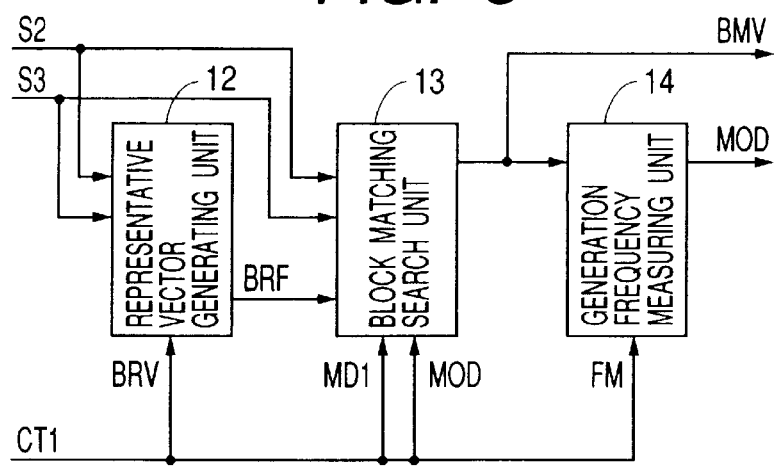
FIG. 3 is a block diagram showing a typical configuration of a block unit movement vector searching unit.

FIG. 3 is a block diagram showing a typical configuration of the block unit movement vector searching unit 4. As shown in the figure, the block unit movement vector searching unit 4 comprises a representative vector generating unit 12, a block matching search unit 13 and a generation frequency measuring unit 14.

Figure 4:
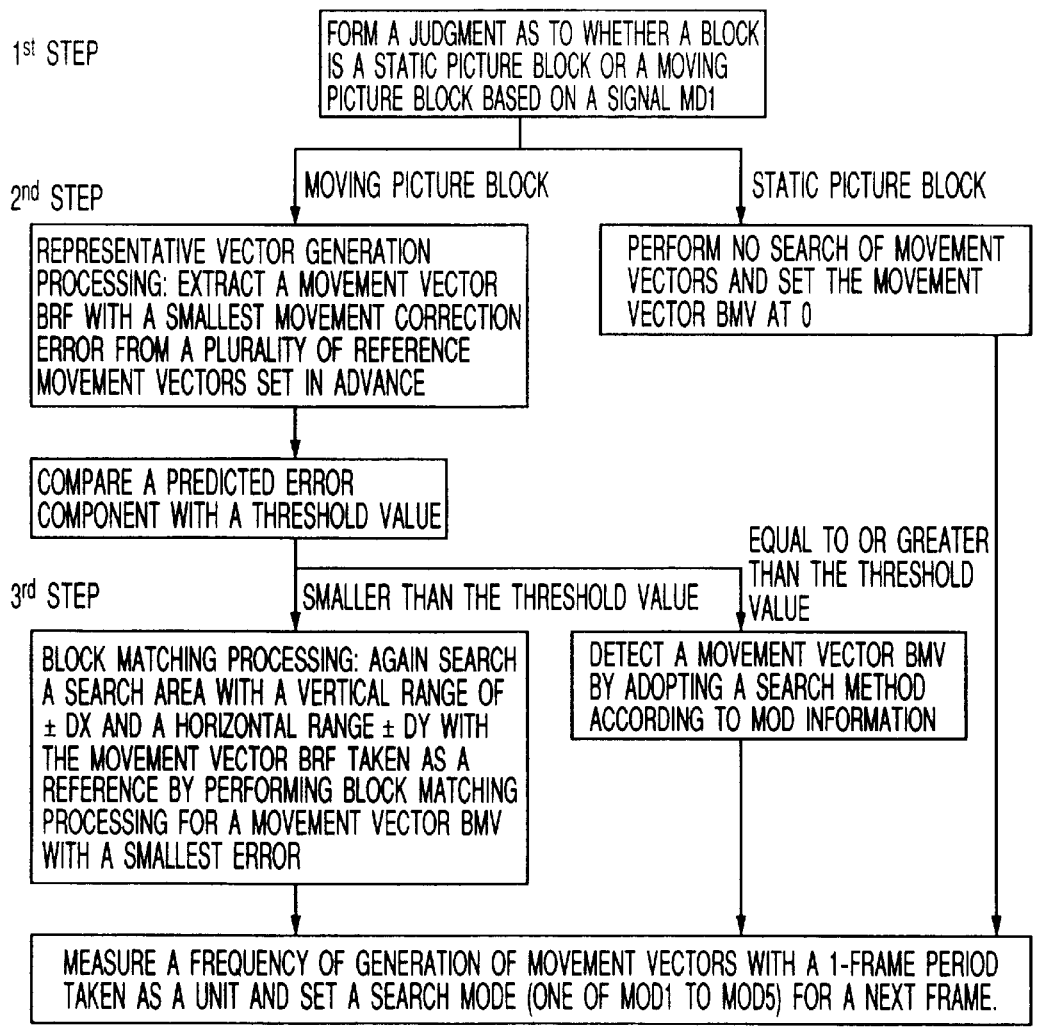
FIG. 4 is a diagram showing a flowchart representing signal processing carried out by the block unit movement vector searching unit.

FIG. 4 is a diagram showing a flowchart representing signal processing carried out by the block unit movement vector searching unit 4. As shown in the figure, the flowchart begins with a first step to form a judgment as to whether a block is a static picture or moving picture block. If the movement detection signal MD1 is 0, indicating a static picture block, the movement vector search operation is not carried out and a block unit movement vector BMV set at 0 is output. The movement vector search operation described below is carried out only if the movement detection signal MD1 is 1, indicating a moving picture block.

The movement vector search operation begins with a second step of the signal processing of a moving picture block which is carried out by the representative vector generating unit 12 shown in FIG. 3. The representative vector generating unit 12 outputs one of movement vectors BRV of reference blocks determined in advance that has a smallest predicted error component as a representative movement vector BRF. It should be noted that a block Bu right above the current block which has already completed a movement vector search and blocks Bul and Bur respectively preceding and succeeding the block Bu as shown in FIG. 5 are selected as the reference blocks. One of movement vectors Vu, Vul and Vur of the reference blocks Bu, Bul and Bur respectively that has a smallest predicted error is output as the representative movement vector BRF.

Next, the signal processing of the moving picture block at a third step is carried out by the block matching search unit 13 shown in FIG. 3. If the predicted error component of the representative vector BRF is smaller than a threshold value of typically 8 levels/pixel, reference vector search processing is carried out. To put it in detail, a predicted error is computed in block matching processing for movement vectors each with an x direction component in the range ±DX where typically DX=2 and a y direction component in the range ±DY where typically DY=2 with the representative movement vector BRF taken as an origin. One of the movement vectors with a smallest predicted error is output as a block unit movement vector BMV.

If the predicted error component of the representative vector BRF is equal to or greater than the threshold value, on the other hand, an entire search area determined by search mode information MOD is searched or movement vector distribution adaptive search processing of representative point search is carried out to detect a block unit movement vector BMV.

FIG. 6 is diagrams showing typical movement vector generation frequencies and typical search modes setting. To be more specific, FIG. 6(a) is a diagram showing areas each for measuring a frequency at which a movement vector is generated. The horizontal axis of the figure represents the absolute value abs (vx) of the x direction component of the movement vector and the vertical axis represents the absolute value abs (vy) of the y direction component of the movement vector. An area A is a range where 0<abs (vx)<=4 and 0<abs (vy)<=2. An area B is a range where 0<abs (vx)<=8 and 0<abs (vy)<=4 excluding the area A. An area C is a range where 0<abs (vx)<=12 and 0<abs (vy)<=6 excluding the areas A and B. An area D is a range where 0<abs (vx)<=16 and 0<abs (vy)<=8 excluding the areas A, B and C. An area E is a range where abs (vx)>16 and abs (vy)>8. The number of movement vectors in each of the areas A, B, C, D and E generated in a 1-frame period is computed to give a generation frequency for each of the areas.

FIG. 6(b) shows a table showing typical characteristics of a set condition and search processing for different search modes.

In a search mode MOD1 where the probability of generation in the area A is 100%, an entire search region with a horizontal range of ±4 pixels and a vertical range of ±2 lines is searched.

In a search mode MOD2 where the probability of generation in the area A is at least 95%, an entire search region with a horizontal range of ±8 pixels and a vertical range of ±4 lines is searched.

In a search mode MOD3 where the probability of generation in the areas A and B is at least 95%, a layout of representative point movement vectors composed of a dense area is searched over a search region with a horizontal range of ±12 pixels and a vertical range of ±6 lines is searched.

In a search mode MOD4 where the probability of generation in the areas A, B and C is at least 95%, a layout of representative point movement vectors composed of a dense area is searched over a search region with a horizontal range of ±16 pixels and a vertical range of ±8 lines is searched.

In a search mode MOD5 where the probability of generation in the areas A, B, C and D is at least 95%, a double area layout of representative point movement vectors composed of a dense area and a sparse area is searched over a search region with a horizontal range of ±24 pixels and a vertical range of ±12 lines is searched.

Figure 7:
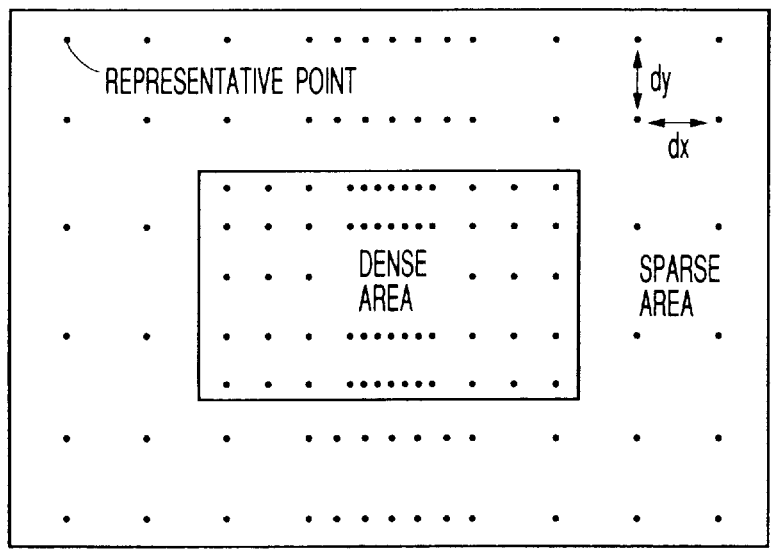
FIG. 7 is a diagram showing a typical arrangement of movement vectors at representative points.

FIG. 7 is a diagram showing a typical arrangement of movement vectors at representative points. An area at the origin is a dense area and an area on the circumference is a sparse area. Typically, in the dense area, a gap in the horizontal direction between movement vectors at 2 adjacent representative points is 2 pixels and a gap in the vertical direction between movement vectors at 2 adjacent representative points is 2 lines. In the sparse area, on the other hand, a gap in the horizontal direction between movement vectors at 2 adjacent representative points is 4 pixels and a gap in the vertical direction between movement vectors at 2 adjacent representative points is 4 lines. Depending on the search mode, a layout of representative points composed of only a dense area or a double area layout of representative points composed of dense and sparse areas is searched in order to reduce the amount of signal processing. To put it in detail, first of all, one of movement vectors in the layout of representative points or the double area layout of representative points with a smallest predicted error component is detected. Then, a predicted error is computed in block matching processing for movement vectors each with an x direction component in the range ±DX where typically DX=2 and a y direction component in the range ±DY where typically DY=2 with the detected representative point movement vector taken as an origin. One of the movement vectors with a smallest computed predicted error is output as a block unit movement vector BMV.

It should be noted that, as a search region, it is possible to use an area that covers a region in which a motion judder disturbance is detected, that is, a region in which the movement speed is up to about 1 sec/screen width and 1 sec/screen height. Thus, the search region can be limited to an area shown in FIG. 7 with a horizontal range of ±MX pixels where MX is typically 24 and a vertical range of ±MY lines where MY is typically 12. In addition, since a television screen has an aspect ratio of 4:3 or 16:9 for displaying a horizontal rectangular picture, it is proper to set horizontal and vertical search regions with the former wider than the latter.

Refer back to FIG. 3. The generation frequency measuring unit 14 measures the generation frequency of movement vectors during a 1-frame period from measurement period information FM. As described above, the generation frequency measuring unit 14 then sets search mode information MOD according to a distribution state of the generation frequency.

As described above, the search for a block unit movement vector is limited to a moving picture block and, since reference vector search processing or movement vector distribution adaptive search processing is carried out, the amount of signal processing required in such a search can be reduced by an order of 1 to 2 digits in comparison with the complete search.

Figure 8:
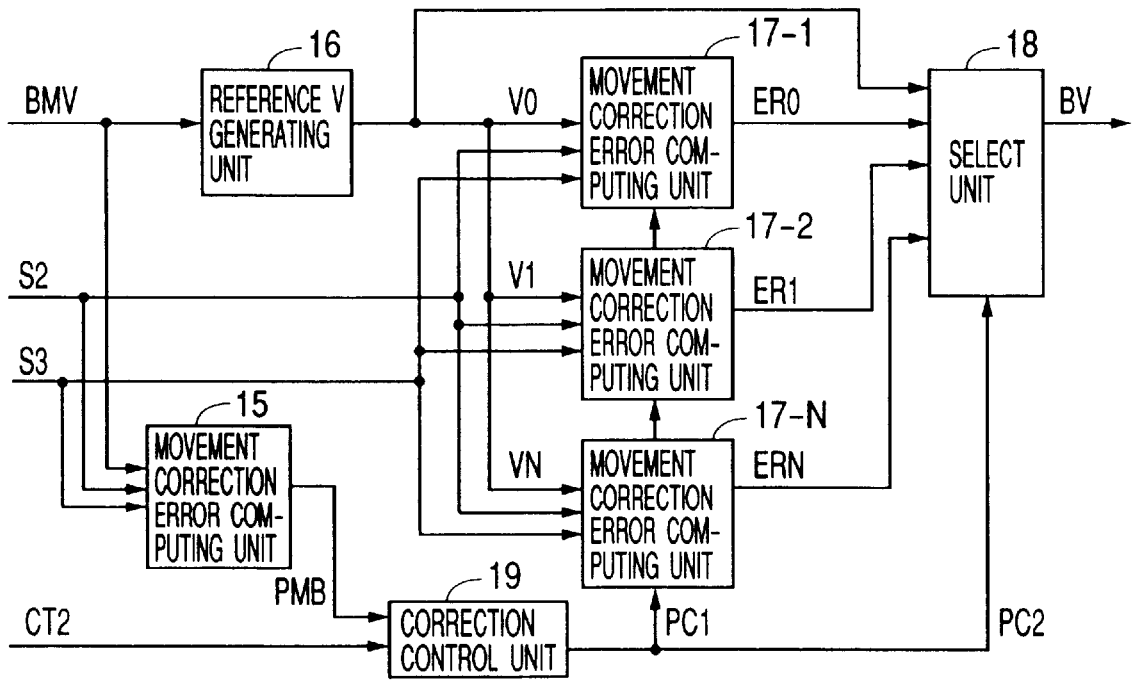
FIG. 8 is a block diagram showing a typical configuration of a movement vector correcting unit.

Next, the movement vector correcting unit is explained by referring to FIGS. 8 to 10.

FIG. 8 is a block diagram showing a typical configuration of the movement vector correcting unit 5. A movement correction error computing unit 15 shown in the figure carries out processing at a first step of a flowchart of signal processing shown in FIG. 9. In the processing carried out at the first step, a predicted error is computed from the block unit movement vector BMV detected earlier for the luminance signal components of the signal S2 of the current frame and the signal S3 of the immediately preceding frame. For a block with a value of this error smaller than a threshold value TH of typically 8 levels /pixel, the movement correction error computing unit 15 outputs a PMB signal with a value of 0. For a block with a value of this error equal to or greater than the threshold value TH, on the other hand, the movement correction error computing unit 15 sets the PMB signal with a value of 1.

A correction control unit 19 generates control signals PC1 and PC2 required in the signal processing carried out at a second step of the flowchart shown in FIG. 9 from the signal PMB and the control signal CT2.

A reference movement vector generating unit 16 and movement correction error computing units 17-0 to 17-N carry out processing at the second step of the flowchart shown in FIG. 9 for a value of the predicted error equal to or greater than the threshold value TH. To put it in detail, a current block is divided in the horizontal and vertical directions into miniblocks as shown in FIG. 10. Each of the miniblocks has a horizontal width of MBY pixels and a vertical height of MBY lines where, typically, MBX=2 and MBY=2. For the miniblocks, a corrected movement vector is generated in miniblock division search processing carried out on movement vectors of the current and reference blocks. In the reference movement vector generating unit 16, a movement vector V0 of the current frame and movement vectors Vul,—, Vdr of blocks adjacent to the current block are then output. The movement correction error computing units 17-0 to 17-N compute predicted errors ER0 to ERN respectively by carrying out processing in accordance with Eqs. (1) shown below for the miniblocks. It should be noted that the predicted errors ER0 to ERN are each computed as a difference in luminance signal component or both luminance and chrominance signal components between the signal S2 of the current frame and the signal S3 of the immediately preceding frame.

$$ER0 = \Sigma abs\{S2(x, y) - S3(V0)\} = \Sigma abs \{S2(x, y) - S3(x+V0x, y+V0y)\}$$

$$ER1 = \Sigma abs\{S2(x, y) - S3(Vu1)\} = \Sigma abs \{S2(x, y) - S3(x+Vu1x, y+Vu1y)\}$$

$$ER2 = \Sigma abs\{S2(x, y) - S3(Vu)\} = \Sigma abs\{S2(x, y) - S3(x+Vux, y+Vuy)\}$$

$$ERN = \Sigma abs\{S2(x, y) - S3(Vdr)\} = \Sigma abs\{S2(x, y) - S3(x+Vdrx, y+Vdry)\} \quad (1)$$

wherein notation S2 (x, y) is a signal of the current frame, notation S3 (Vi) is a signal of the immediately preceding frame with the position thereof moved by a vector Vi, notation abs { } indicates the absolute value of an expression enclosed in the braces { }, notation Σ indicates the total summation for pixels in a miniblock, notation Vix is the x component of the movement vector Vi and notation Viy is the y component of the movement vector Vi.

If the control signal PC2 indicates a block with a value of the predicted error smaller than the threshold value, a select unit 18 outputs the movement vector BMV of the current block as a corrected movement vector BV for miniblocks in the block. In the case of a block with a value of the error equal to or greater than the threshold value, on the other hand, a movement vector resulting in the smallest among the predicted errors ER0, ER1,—, ERN for the miniblocks is output as the corrected movement vector BV.

Figures 11, 12:
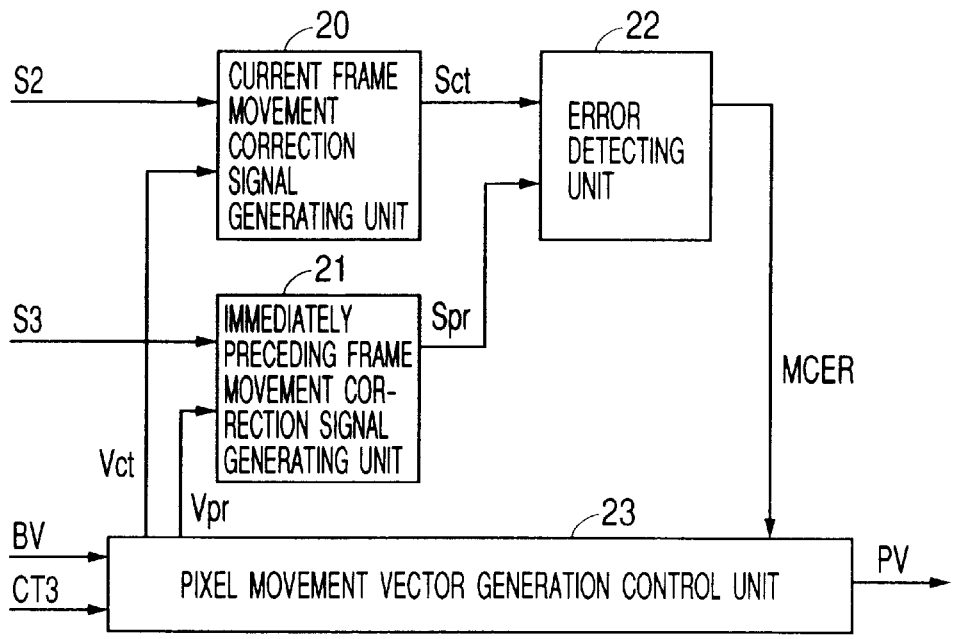
FIG. 11 is a block diagram showing a typical configuration of a pixel unit movement vector generating unit.
FIG. 12 is a diagram showing a flowchart representing signal processing carried out by the pixel unit movement vector generating unit.
Figure 13:
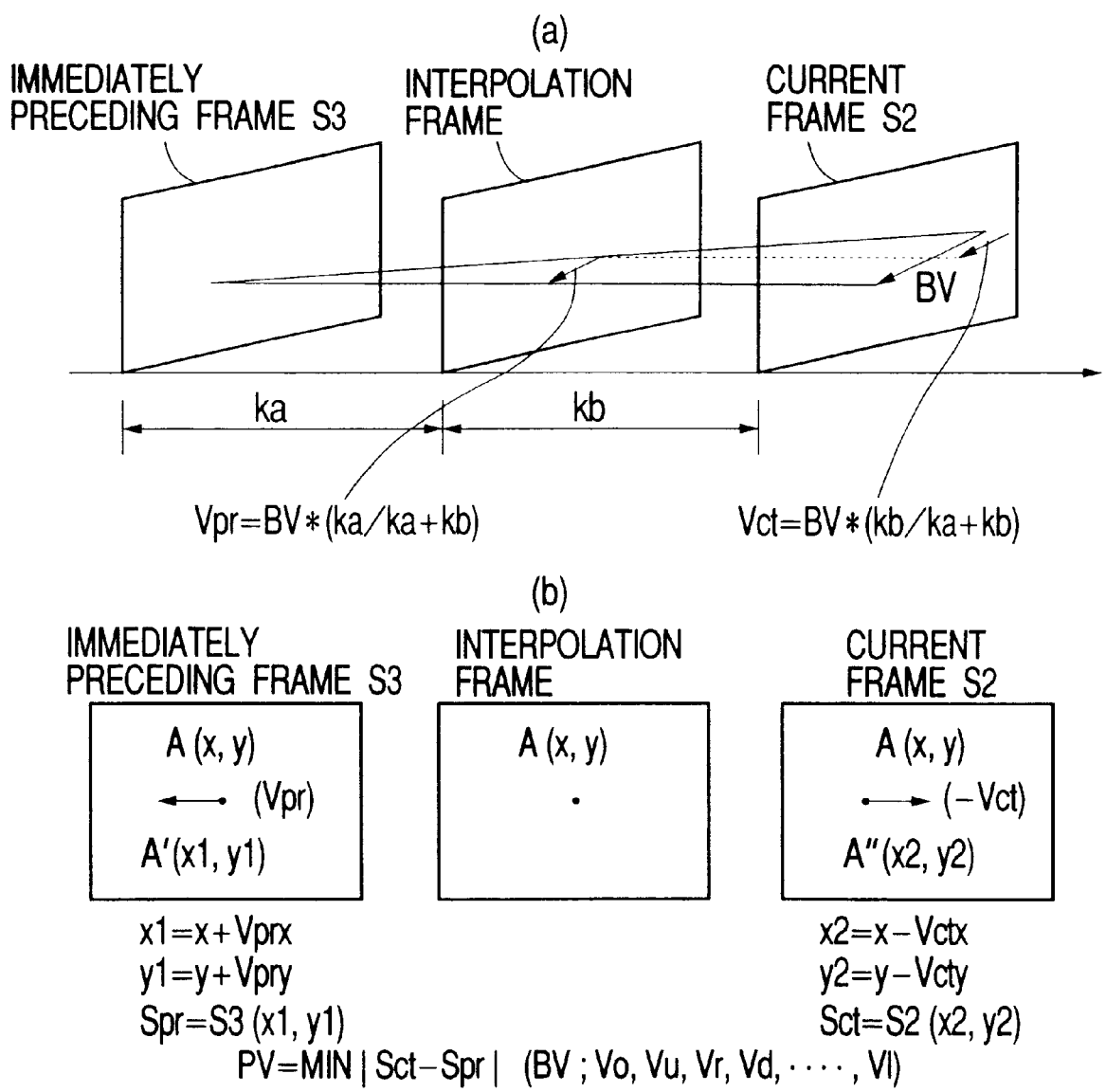
FIG. 13(a) is a diagram showing an operation to generate an MC vector and FIG. 13(b) is a diagram showing an operation to generate a movement correction signal in a simple and plain manner.

Next, the pixel unit movement vector generating unit is explained by referring to FIGS. 11 to 13.

FIG. 11 is a block diagram showing a typical configuration of the pixel unit movement vector generating unit 6. A pixel movement vector generation control unit 23 shown in the figure carries out various kinds of control processing required for operations performed at the first and second steps of a signal processing flowchart shown in FIG. 12 on the basis of a control signal CT3 and the corrected movement vector BV. First of all, the corrected movement vector is used in calculation of a predicted error component in a block unit. If the predicted error is smaller than a threshold value TH of typically 8 levels/pixel, the corrected movement vector BV is output as a pixel unit movement vector PV as it is.

If the predicted error is equal to or greater than the threshold value TH, on the other hand, MC vectors Vct and Vpr required for generation of an interpolation frame signal representing movement correction are generated from corrected movement vectors of the current block and blocks adjacent to the current block shown in FIG. 10. Then, a current frame movement correction signal generating unit 20 generates a movement correction signal Sct, that is, the signal S2 of the current frame at a position moved by the MC vector Vct. On the other hand, an immediately preceding frame movement correction signal generating unit 21 generates a movement correction signal Spr, that is, the signal S3 of the immediately preceding frame at a position moved by the MC vector Vpr.

FIG. 13 is a diagram showing an outline of these operations. FIG. 13(a) is a diagram showing an operation to generate an MC vector. The corrected movement vector BV represents a movement during a 1-frame period between the immediately preceding frame S3 and the current frame S2. An interpolation frame shown in the figure is a frame generated as a result of interpolation in frame count transformation at a position represented by a ratio of ka:kb in the 1-frame period. Assume transformation of a frame count of 50 into a frame count of 60 for example. In this transformation, for a signal series of a frame order 1 to 5, 5 interpolation frames are generated at positions represented by ratios of 5:1, 4:2, 3:3, 2:4 and 1:5 respectively. In this way, the signal series of the frame order 1 to 5 is converted into a signal series of a frame order 1 to 6. In order to generate a signal at the position of an interpolation frame with a position ratio ka:kb in movement correction, the MC vectors Vpr and Vct are generated by processing based on Eqs. (2) as follows:

$$Vpr=BV*ka/(ka+kb)$$

$$Vct=BV*kb/(ka+kb) \quad (2)$$

FIG. 13(b) is a diagram showing an operation to generate a movement correction signal. In terms of the signal S3 of the immediately preceding frame, a signal of a point A (x, y) on the interpolation frame corresponds to a signal of a point A' (x1, y1) moved from the point A(x, y) on the immediately preceding frame by a movement correction vector Vpr with a horizontal direction component Vprx and a vertical direction component Vpry. Thus, x1=x+Vprx and y1=y+Vpry. In terms of the signal S2 on the current frame, on the other hand, the signal of the point A (x, y) on the interpolation frame corresponds a signal S2 of a point A" (x2, y2) moved from the point A (x, y) on the current frame by a movement correction vector Vct with a horizontal direction component Vctx and a vertical direction component Vcty. Thus, x2=x−Vctx and y2=y−Vcty. That is to say, the movement correction signals Spr and Sct are given by Eqs. (3) as follows:

$$Spr=S3(x+Vprx, y+Vpry)$$

$$Sct=S2(x-Vctx, y-Vcty)\text{tm } (3)$$

If the movement vectors are accurate, the movement correction signal Spr matches the movement correction signal Sct. Now, refer back to FIG. 11. An error detecting unit 22 computes an absolute difference |Sct−Spr| between the two movement correction signals Sct and Spr, outputting a signal MCER.

The pixel movement vector generation control unit 23 searches the corrected movement vectors BV of the current block and blocks adjacent to the current block shown in FIG. 10 for one with a smallest signal MCER and outputs the corrected movement vector BV with the smallest signal MCER as a pixel unit movement vector PV.

In addition, for a pixel with a movement detection signal MD2 of the control signal CT3 set at 0, a pixel unit movement vector PV set at 0 is output.

The pixel unit movement vector resulting from this processing can be output with a high degree of precision and with an amount of processing reduced by an order of 1 to 2 digits in comparison with a whole search operation.

Here, the explanation of the search of movement vectors is finished. Next, the MC interpolation frame signal generating unit is explained by referring to FIGS. 14 to 16.

Figure 14:
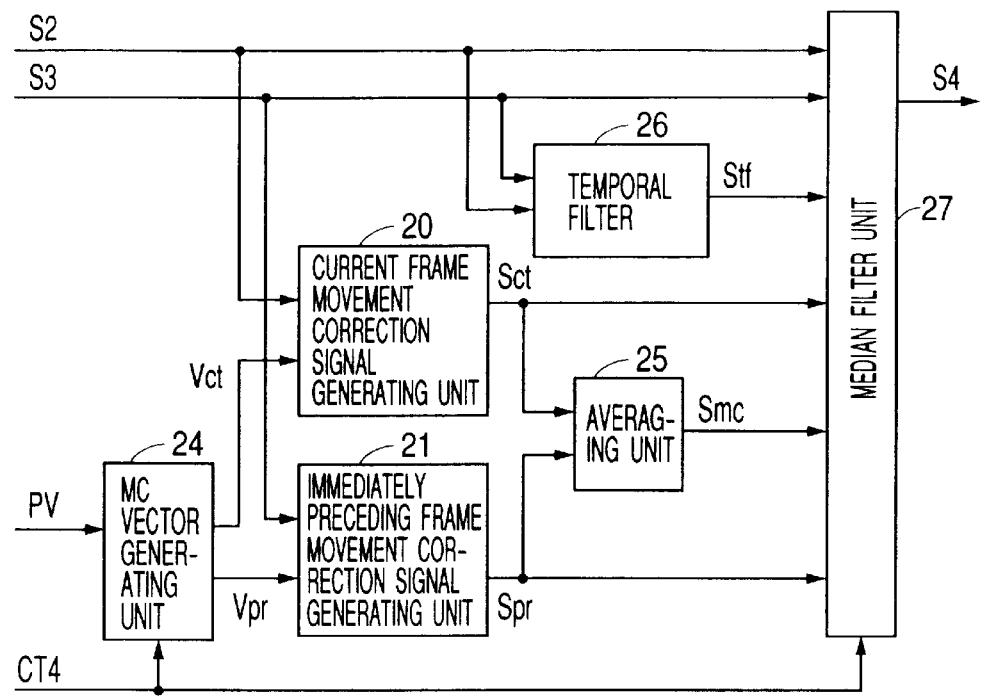
FIG. 14 is a block diagram showing a typical configuration of an MC interpolation frame signal generating unit.

FIG. 14 is a block diagram showing a typical configuration of the MC interpolation frame signal generating unit 7. An MC vector generating unit 24 shown in the figure generates the MC vectors Vct and Vpr required in the movement correction processing described above from the pixel element movement vector PV. A current frame movement correction signal generating unit 20 generates the movement correction signal Sct from the signal S2 of the current frame and the MC vector Vct. By the same token, an immediately preceding frame movement correction signal generating unit 21 generates the movement correction signal Spr from the signal S3 of the immediately preceding frame and the MC vector Vpr. These pieces of processing are carried out by controlling operations to read out data from an embedded memory circuit. To put it in detail, signals are read out from addresses which are generated by shifting memory read addresses by distances corresponding to the MC vectors Vct and Vpr. Signals read out from the shifted addresses are signals of positions moved by the MC vectors.

An averaging unit 25 computes an average of the movement correction signals Spr and Sct to output a signal Smc of a bi-directional movement correction interpolation frame.

A temporal filter 26 carries out linear interpolation processing in the time direction to generate an interpolation value between the signals S2 and S3 of the current and immediately preceding frames respectively as a signal Stf of a time direction interpolation frame.

A median filter unit 27 selects one of the signals Smc, Sct, Spr, S2, S3 and Stf in accordance with a movement correction predicted error component and the value of an error performance function and outputs the selected signal as a picture signal series S4 of sequential scanning completing frame count transformation processing of the movement correction type.

Figure 15:
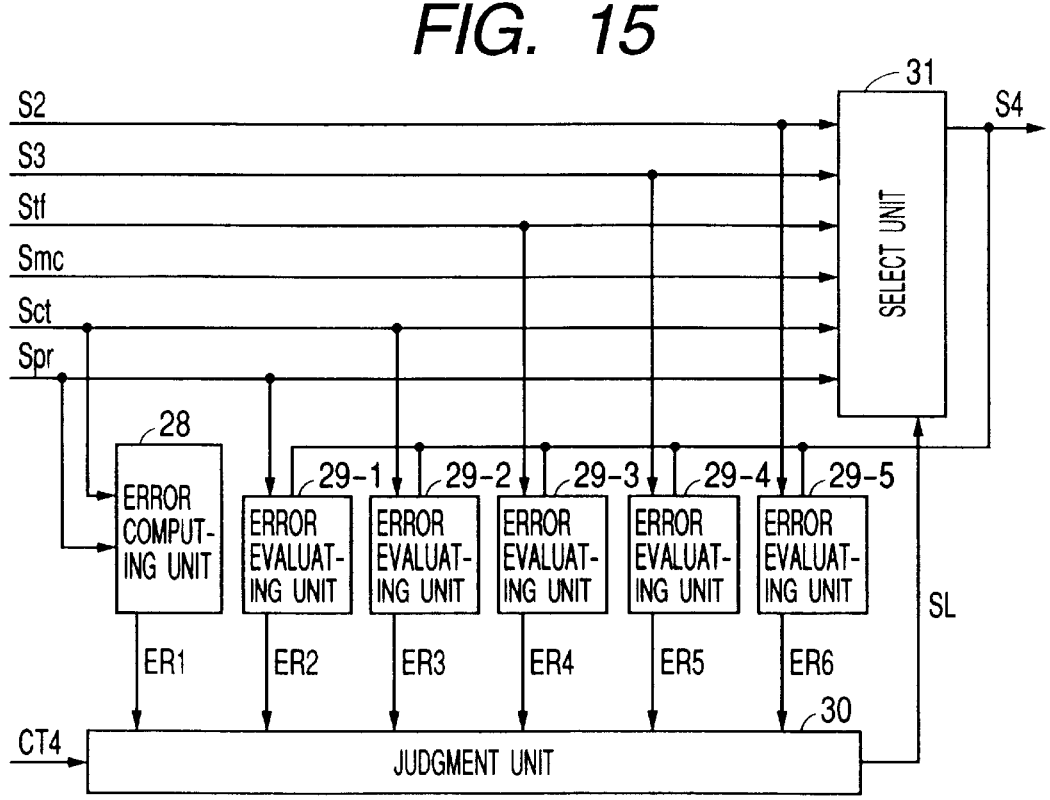
FIG. 15 is a block diagram showing a typical configuration of a median filter unit.
Figure 16:
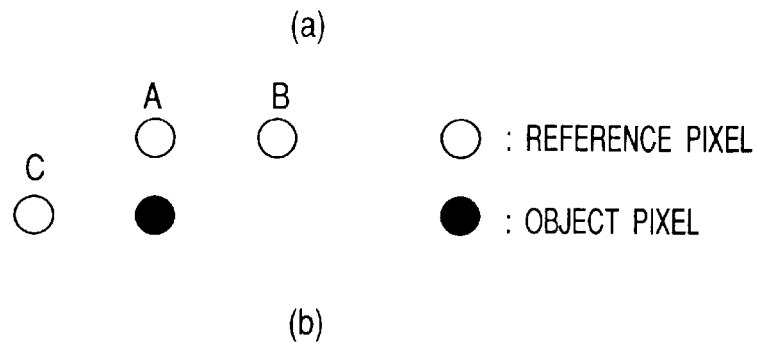

FIG. 15 is a block diagram showing a typical configuration of the median filter unit 27. An error computing unit 28 shown in the figure computes a difference between the movement correction signals Sct and Spr and outputs the absolute value of the difference as a signal ER1. Error evaluating units 29-1 to 29-5 output error signal components at reference pixels as shown in FIG. 16(a) as signals ER2 to ER6 respectively. To put it in detail, for an object pixel denoted by a black circle in FIG. 16(a), ERn is equal to a sum of error components |S4−Si| at reference pixels A, B and C each denoted by a white circle where notation ERn is a generic symbol representing the error signal components ER2 to ER5 and notation S1 is a generic symbol representing the signals Sct, Spr, S2, S3 and Stf corresponding to the error signal components ER2 to ER5 respectively.

A judgment unit 30 sets a select signal SL shown in FIG. 16(b) on the basis of movement correction mode information MC of a control signal SC4 and the signals ER1 to ER6. The movement correction mode information MC is set at 1 to indicate processing other than movement correction when, a movement vector generation frequency measured by the generation frequency measuring unit 14 shown in FIG. 3, for example, the frequency of generation of movement vectors in the area E, is at least 20%. In other cases, the movement correction mode information MC is set at 0 to indicate movement correction processing. To put it in detail, for a signal MC of 0, a select signal SL is output to the select unit 31 to select the signal Smc if the error signal component ER1 is smaller than a threshold value. For an error signal component ER1 equal to or greater than the threshold value, on the other hand, the select signal SL is generated so that the signal Spr, Sct, Stf, S3 or S2 is selected if the error signal component ER2, ER3, ER4, ER5 or ER6 respectively has a smallest value. If the signal MC is set at 1, on the contrary, the select signal SL is set to select the signal S2.

The select unit 31 selects one of the signals Smc, Sct, Spr, S2, S3 and Stf in accordance with the select signal SL supplied thereto by the judgment unit 30.

By employing the median filter unit 27 having a configuration described above, it is possible to substantially reduce the amount of picture quality degradation inherent in movement correction such as deterioration on an edge circumference of a moving picture and isolated point deterioration caused by inaccuracy of a movement vector. As a result, an improvement of the picture quality can be achieved.

According to the first embodiment of the present invention described above, the amount of processing required in a search of movement vectors is small and it is possible to implement a frame count transformation apparatus for transforming the number of frames in a picture signal with little picture quality deterioration inherent in movement correction processing. In addition, the embodiment also provides a remarkable effect of picture quality improvement and cost reduction.

Figure 17:
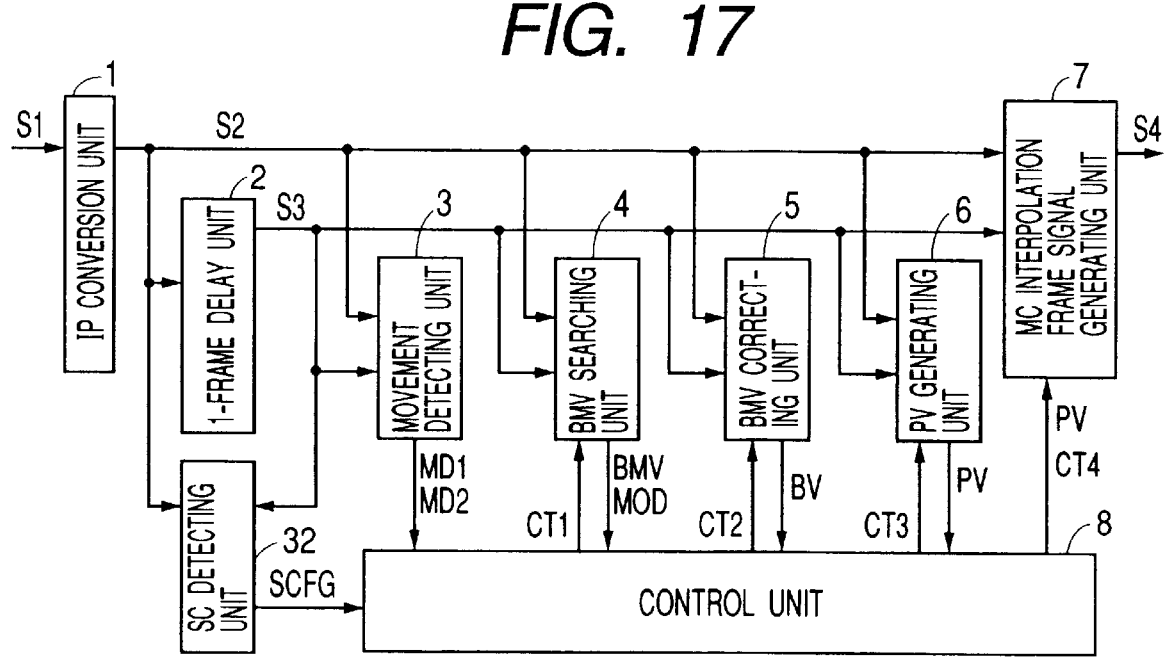
FIG. 17 is a block diagram showing the configuration of a second embodiment of the present invention.
Figure 18:
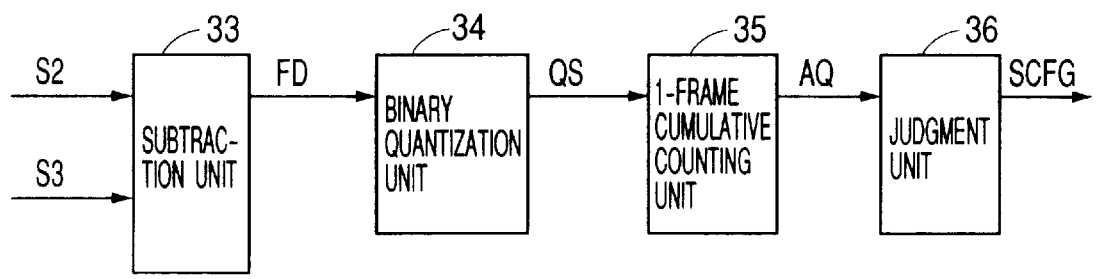
FIG. 18 is a block diagram showing a typical configuration of a scene change detecting unit.

Next, a second embodiment of the present invention is explained by referring to FIGS. 17 and 18. The present embodiment is best suited for suppression of an increase in processing amount that results in a scene change area.

FIG. 17 is a block diagram showing the configuration of the present embodiment. As shown in the figure, the configuration is obtained by adding a scene change detecting unit 32 to the configuration of the first embodiment shown in FIG. 1. In an area where a scene changes, the processing to search movement vectors and to insert a movement correction frame are halted.

FIG. 18 is a block diagram showing a typical configuration of the scene change detecting unit 32. A subtraction unit 33 shown in the figure computes a difference in luminance signal component between the signal S2 of the current frame and the signal S3 of the immediately preceding frame, extracting a differential component FD between the 2 successive frames. In general, in a scene change area, the substance of the picture changes. Thus, the level of the differential component FD is relatively high. For this reason, a binary quantization unit 34 uses threshold values ±Thb set at a relatively high level for carrying out binary quantization on the differential component FD for each pixel. For a pixel with a differential component FD within the range of the threshold values ±Thb, a signal Qs set at 0 is output. For a pixel with a differential component FD beyond the range of the threshold values ±Thb, on the other hand, a signal QS set at 1 is output. A 1-frame cumulative counting unit 35 counts the number of pixels indicated by a signal QS set at 1 which are observed during a 1-frame period, outputting a cumulative value AQ for the 1-frame period. A judgment unit 36 judges a frame to be a frame where a scene changes if the cumulative value AQ is equal to or greater than half the total number of pixels of the screen and the generation of their signals QS is limited to the 1-frame period. The judgment is formed in that way in order to avoid an incorrect operation to detect a movement of a horizontal or vertical pan, in which the entire screen moves at a uniform speed, as a scene change. The judgment unit 36 generates a signal SCFG set at 1 for a frame in which the scene changes or set at 0 for other frames.

Since other operations are the same as those of the first embodiment, their explanation is not repeated.

According to the present embodiment described above, it is possible to implement a frame count transformation apparatus for transforming the number of frames in a picture signal which allows the amount of processing required in a search of movement vectors to be reduced. In addition, the embodiment also provides a remarkable effect of picture quality improvement and cost reduction.

Figure 19:
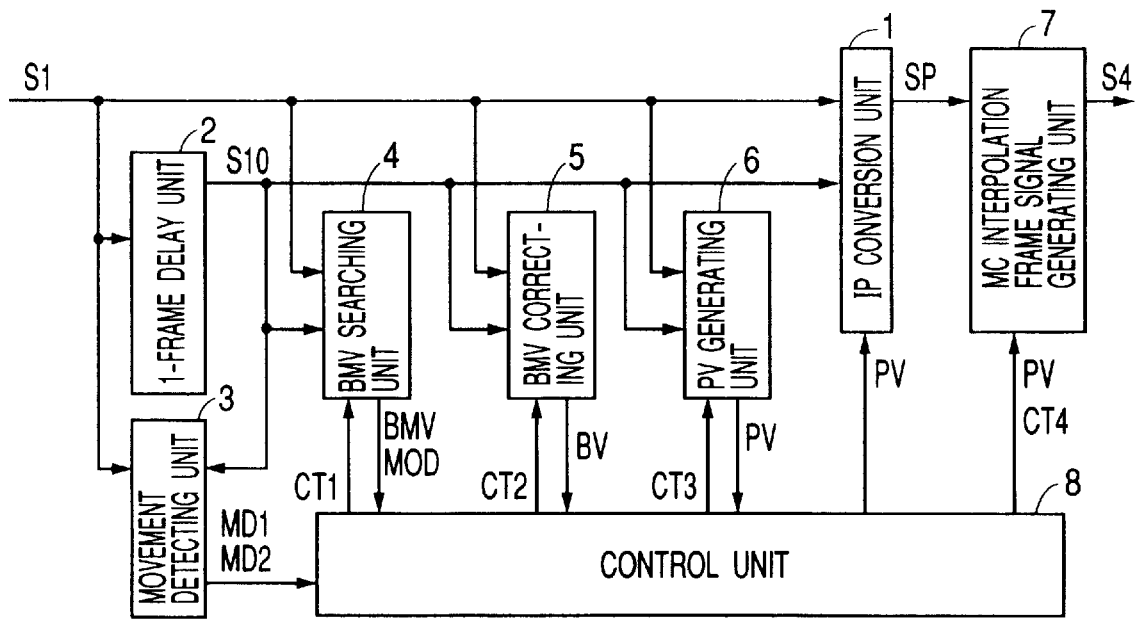
FIG. 19 is a block diagram showing the configuration of a third embodiment of the present invention.

Next, a third embodiment of the present invention is explained by referring to FIG. 19, a diagram showing the configuration thereof. The present invention is best suited for a search of movement vectors in a signal series of interlaced scanning.

A 1-frame delay unit 2 shown in the figure delays an input picture signal S1 (comprising luminance and chrominance signal components) of interlaced scanning by 1 period of time corresponding to 1 frame to produce a signal series S10 of interlaced scanning for the immediately preceding frame.

A movement detecting unit 3 carries out processing to find a difference in luminance signal component between the signal series S1 of the current frame and the signal series S10 of the immediately preceding frame, extracting a differential signal between the 2 successive frames. Binary quantization is then carried out on the differential signal to output movement detection signals MD1 and MD2 to a control unit 8.

A block unit movement vector searching unit 4 detects a movement vector for each block which has a typical size of 16 pixels×16 lines or 8 pixels×8 lines. To put it in detail, a control signal CT1 of the control unit 8 includes the movement detection signal MD1. A block with a movement detection signal MD1 of 0 is judged to be a static picture block for which a block unit movement vector BMV set at 0 is output. On the other hand, a block with a movement detection signal MD1 of 1 is judged to be a moving picture block. In this case, the movement vector distribution adaptive search processing or the reference vector search processing described earlier is carried out for the luminance signal components or both the luminance and chrominance signal components of the signals S1 and S10 to detect a block unit movement vector BMV.

A block with a predicted error component of the luminance signal component or both the luminance and chrominance signal components equal to or greater than a threshold value is divided in the horizontal and vertical directions into miniblocks which each have a typical size of 2 pixels×2 lines. The movement vector correcting unit 5 makes correction by carrying out a miniblock division search wherein one of movement vectors of the current block and blocks adjacent to the current block with a smallest predicted error component computed for the associated miniblocks is taken as a movement vector of the miniblocks. The correction based on the miniblock division search results in a corrected movement vector BV.

The pixel unit movement vector generating unit 6 generates one of movement vectors of the current block and blocks adjacent to the current block with a smallest absolute differential component between the luminance signal components or both the luminance and chrominance signal components of signals of the current frame and the immediately preceding frame completing movement correction processing as a pixel unit movement vector PV.

An IP conversion unit 1 is used for carrying out scanning conversion signal processing, that is conversion from interlaced scanning to sequential scanning, to convert the input picture signal S1 into a signal series SP (comprising luminance and chrominance signal components) of sequential scanning. It should be noted that the IP conversion unit 1 can have a configuration for carrying out processing of the conventional movement adaptive type or the movement correction type utilizing the movement vector PV.

The MC (Movement Correction) interpolation frame signal generating unit 7 selects one of complementary signals of a plurality of kinds with a smallest movement correction error in order to generate a picture signal series S4 (comprising luminance and chrominance signal components) of sequential scanning with a frame frequency thereof increased in movement correction frame count transformation processing. One of the complementary signals is selected with the pixel unit movement vector PV used as a base in a median filter configuration employed in the MC interpolation frame signal generating unit 7.

The control unit 8 outputs control signals CT1 to CT4 required in the operations described above to the other components.

Since it is easy to understand the operations of the units composing the third embodiment from the first embodiment explained earlier, their description is not repeated.

Figure 20:
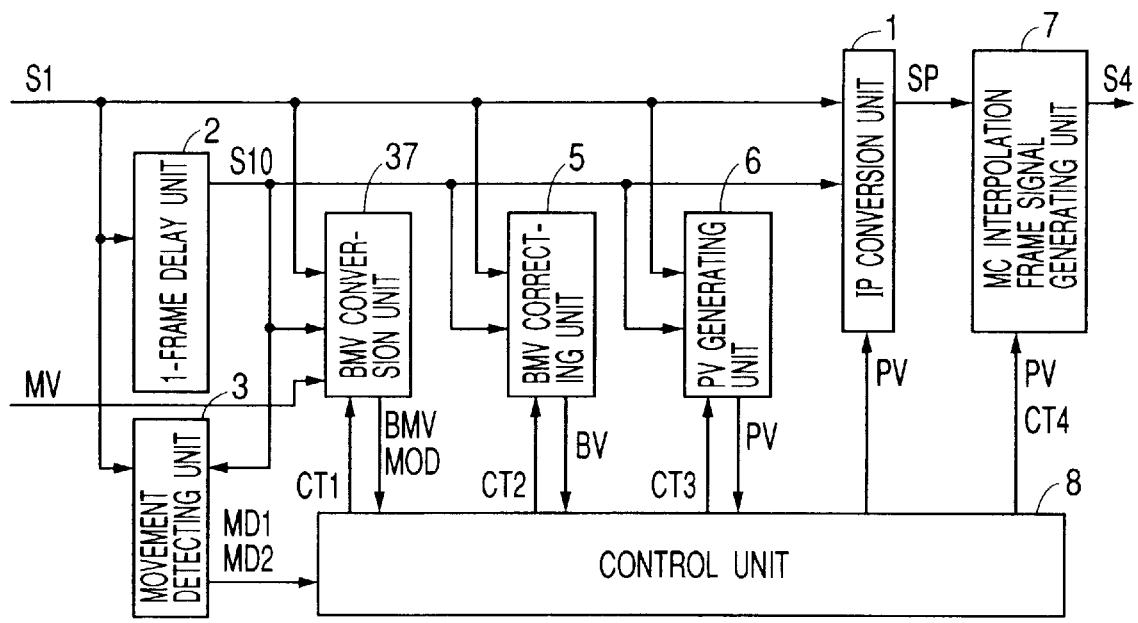
FIG. 20 is a block diagram showing the configuration of a fourth embodiment of the present invention.
Figure 21:
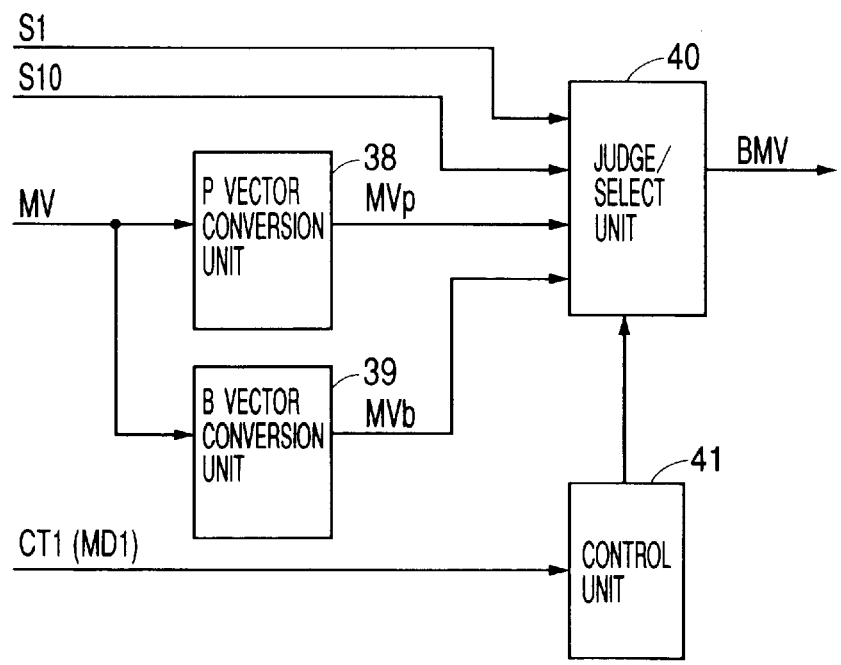
FIG. 21 is a block diagram showing a typical configuration of a block unit movement vector conversion unit.
Figure 22:
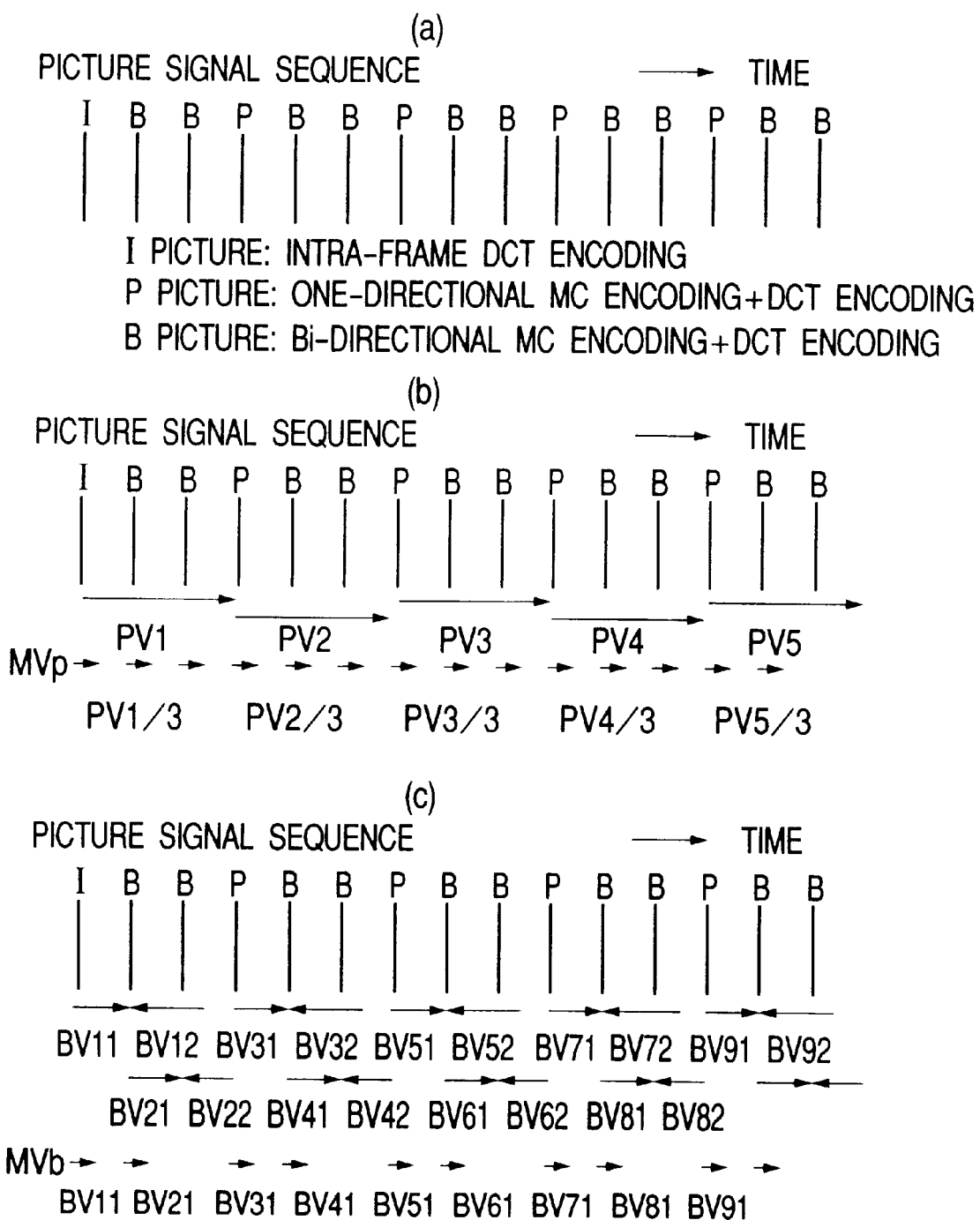
FIGS. 22(a) to 22(c) are each a diagram showing the operation of the block unit movement vector conversion unit in a simple and plain manner.

Next, a fourth embodiment of the present invention is explained by referring to FIGS. 20 to 22. The present invention is best suited for a search of movement vectors based on movement vector information used in picture encoding.

FIG. 20 is a block diagram showing the configuration of the fourth embodiment of the present invention. The configuration of the present embodiment can be implemented by replacing the block unit movement vector searching unit 4 employed in the third embodiment with a block unit movement vector conversion unit 37.

FIG. 21 is a block diagram showing a typical configuration of the block unit movement vector conversion unit 37 and FIG. 22 is diagrams showing the operation of the block unit movement vector conversion unit 37 in a simple and plain manner.

A P vector conversion unit 38 and a B vector conversion unit 39 shown in FIG. 21 carries out vector conversion processing on movement vector information MV used in picture encoding to generate respectively converted vectors MVp and MVb per frame in the interlaced scanning system.

As described above, FIG. 22 is diagrams showing the operation of the block unit movement vector conversion unit 37 in a simple and plain manner. In a picture encoding process, particularly in the MPEG video processing conforming to international standards, a picture signal sequence is split into I pictures, P pictures and B pictures as shown in FIG. 22($a$). In each of the I pictures, an intra-frame DCT (Discrete Cosign Transformation) encoding process is carried out whereas, in a P picture, a one directional MC encoding process and a DCT encoding process are performed. As for a B picture, bi-directional MC encoding and DCT encoding processes are carried out.

FIG. 22($b$) is a diagram showing movement vectors PV1, PV2 and so on used in the encoding of the P pictures. These movement vectors PV1, PV2 and so on each correspond to a movement vector over n frames between 2 consecutive P pictures of the picture signal sequence where n=3 in the case of the example shown in the figure. Thus, in the P vector conversion unit 38, the movement vectors PV1, PV2 and so on are multiplied by 1/n to produce PV1/3, PV2/3 and so on, where n=3 in the case of the example shown in the figure, in order to generate the converted vector MVp.

FIG. 22($c$) is a diagram showing movement vectors BV11, BV21, BV12, BV22 and so on used in the encoding of the B pictures. The movement vectors BV11, BV21, BV31 and so on each correspond to a movement vector over 1 frame between 2 consecutive B pictures of the picture signal sequence. Thus, in the B vector conversion unit 39, the converted vector MVb is generated from the movement vectors BV11, BV21, BV31 and so on.

Refer back to FIG. 21. In a judge/select unit 40 shown in the figure, a block unit movement correction error caused by the converted vectors MVp and MVb is computed for movement vectors with a movement detection signal MD1 of 1. One of the movement vectors with a minimum error is output as a representative movement vector BMV. It should be noted that, for a static picture block, a movement vector BMV set at 0 is output.

A control unit 41 generates a variety of control signals required in these operations.

According to the fourth embodiment described above, it is possible to implement a frame count transformation apparatus for transforming the number of frames in a picture signal which allows the amount of processing required in a search of movement vectors to be reduced. In addition, the embodiment also provides a remarkable effect of picture quality improvement and cost reduction.

Figure 23:
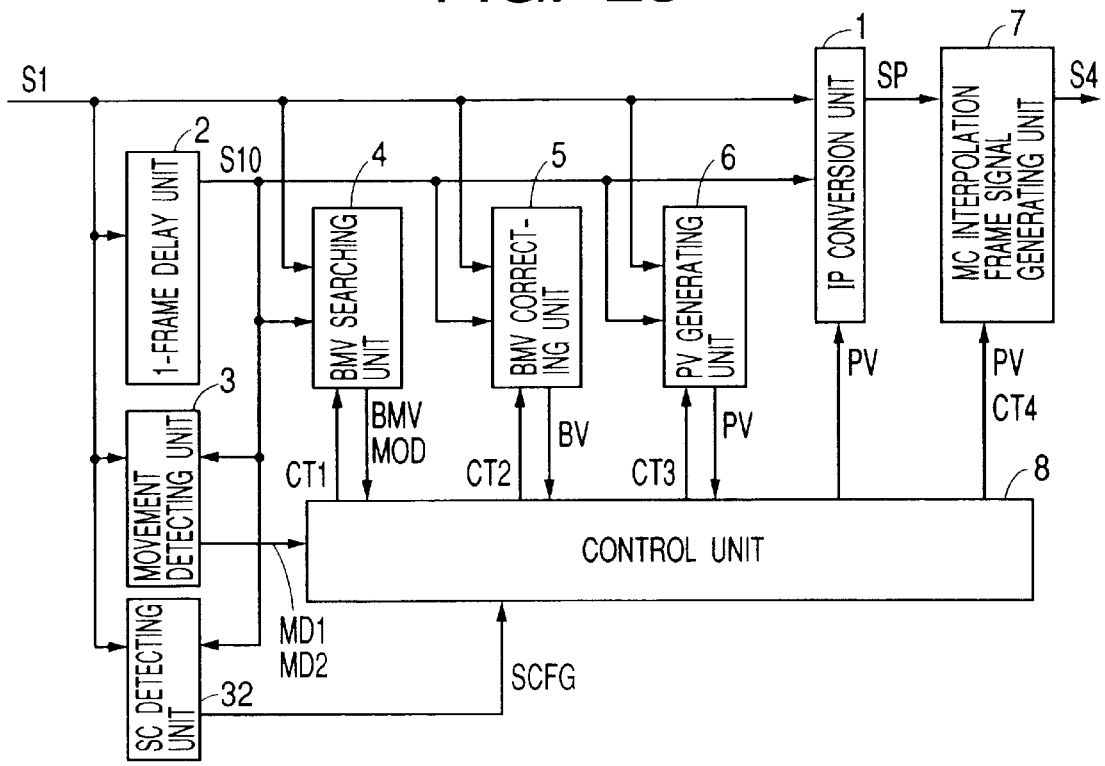
FIG. 23 is a block diagram showing the configuration of a fifth embodiment of the present invention.

Next, a fifth embodiment of the present invention is shown in FIG. 23, a block diagram showing the configuration thereof. As shown in the figure, the configuration is obtained by adding a scene change detecting unit 32 to the configuration of the fourth embodiment shown in FIG. 20.

Figure 24:
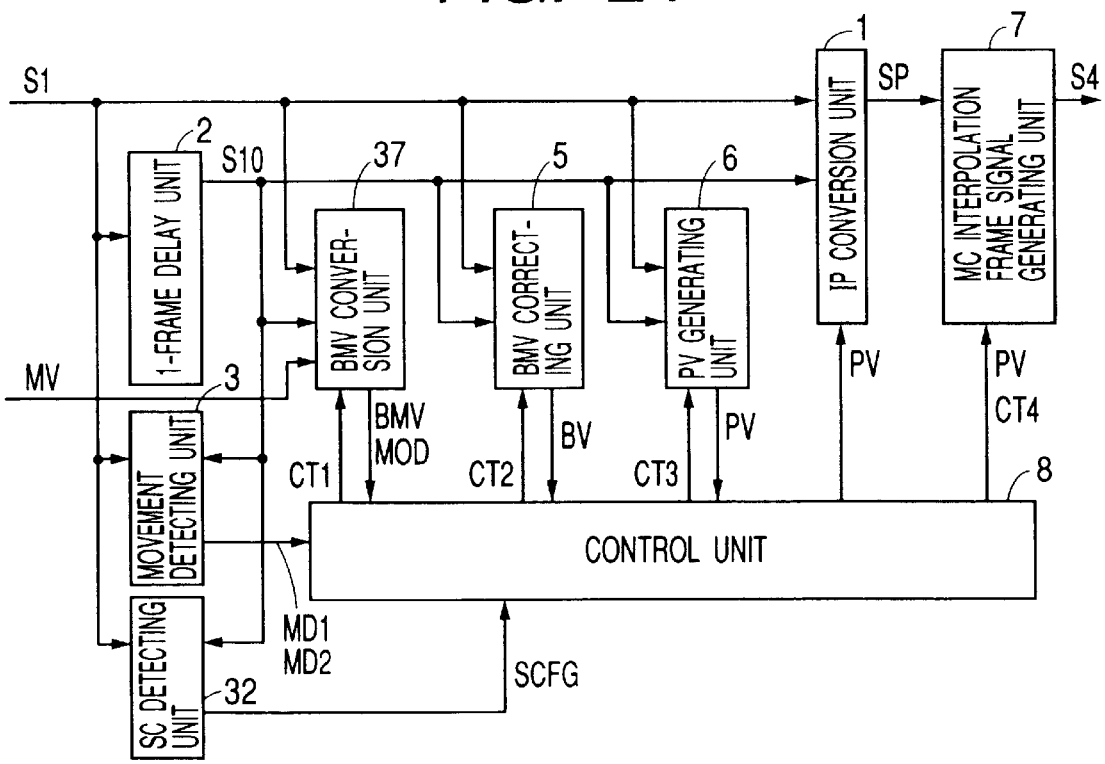
FIG. 24 is a block diagram showing the configuration of a sixth embodiment of the present invention.

Next, a sixth embodiment of the present invention is shown in FIG. 24, a block diagram showing the configuration thereof. As shown in the figure, the configuration is also obtained by adding a scene change detecting unit 32 to the configuration of the fourth embodiment shown in FIG. 20.

Since it is easy to understand the operations of these embodiments from the embodiments explained earlier, their description is not repeated.

Figure 25:
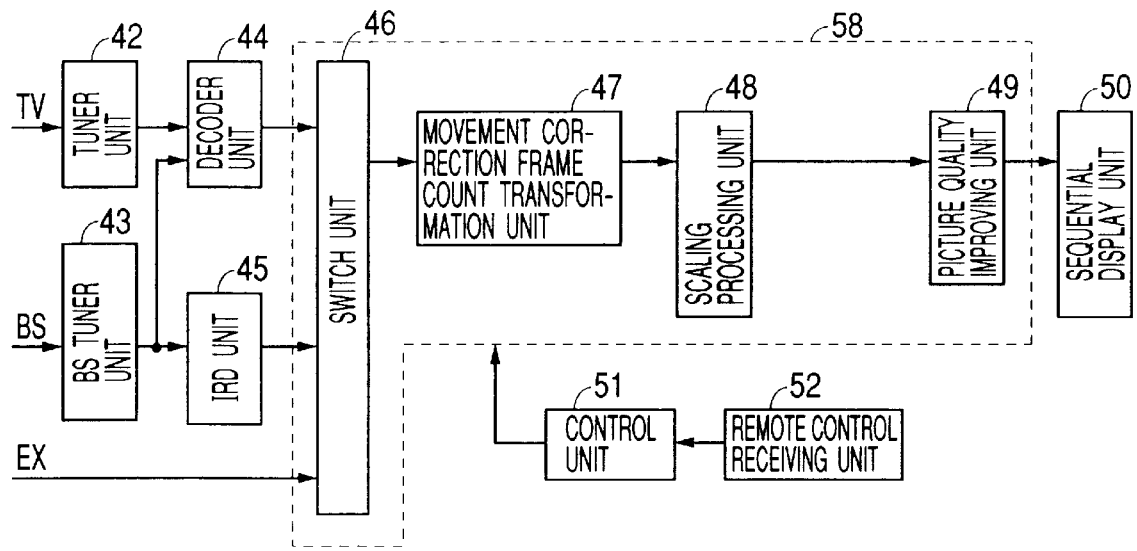
FIG. 25 is a block diagram showing a typical configuration of a first embodiment wherein the present invention is applied to a television receiver.
Figure 26:
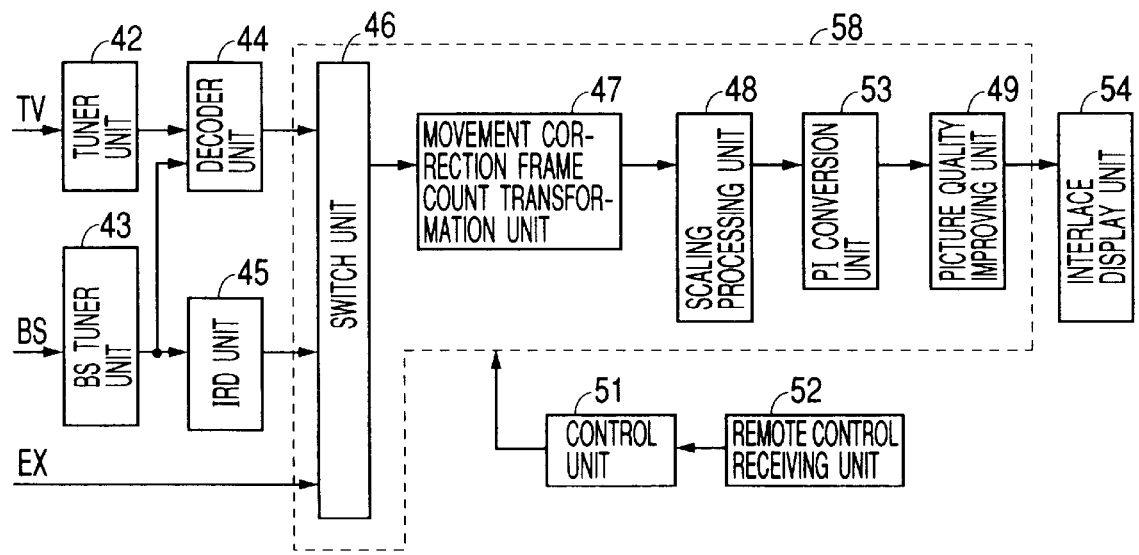
FIG. 26 is a block diagram showing a typical configuration of a second embodiment wherein the present invention is applied to a television receiver.

Finally, embodiments each applying the frame count transformation apparatus provided by the present invention to a television receiver is explained by referring to FIGS. 25 and 26.

FIG. 25 is a block diagram showing a typical configuration of a first embodiment wherein the present invention is applied to a television receiver. The first embodiment is best suited for an operation to display a picture by adopting a sequential scanning technique.

As shown in the figure, a ground broadcast signal TV is supplied to a tuner unit 42 to be converted into a base band television signal. On the other hand, a satellite broadcast signal BS is supplied to a BS tuner unit 43 to be converted also into a base band television signal. A decoder unit 44 performs predetermined demodulation processing on a television signal of the analog system to produce luminance and chrominance signals. On the other hand, an IRD unit 45 carries out predetermined demodulation processing on a television signal of the digital system to produce luminance and chrominance signals. An external input signal Ex comprises luminance and chrominance signals of, among others, information generated by package media such as a VCR or a PC image. A switch 46 is used for selecting a signal series in accordance with a control signal generated by a control unit 51.

A movement correction frame count transformation unit 47 is the frame count transformation apparatus provided by the present invention for generating a signal series of sequential scanning with a frame frequency increased in movement correction frame interpolation processing. For example, in 50 Hz-to-60 Hz transformation of a signal of the PAL system with a frame frequency of 50 Hz, an input signal series with a frame order of 1 to 5 is converted into a signal series with a frame order of 1 to 6 wherein frames 2 to 6 are generated by movement correction frame interpolation processing. In transformation from 50 Hz to 75 Hz, on the other hand, an input signal series with a frame order of 1 to 2 is converted into a signal series with a frame order of 1 to 3 wherein frames 2 and 3 are generated by movement correction frame interpolation processing. As for transformation from 50 Hz to 100 Hz, an input signal series with a frame order of 1 is converted into a signal series with a frame order of 1 to 2 wherein frame 2 is generated by movement correction frame interpolation processing.

A scaling processing unit 48 carries out signal processing such as enlarging and shrinking the size of a picture, transformation of the aspect ratio and transformation of the number of scanning lines. A picture quality improving unit 49 carries out conversion of a signal supplied thereto into a 3-primary—color signal based on color space transformation and picture quality improvement signal processing such as sharpness improvement and luminance tone correction. A sequential display unit 50 displays a picture by adopting the sequential scanning technique with a frame frequency of 60 Hz, 75 Hz or 100 Hz. A remote control receiving unit 52 receives various kinds of user information such as a selected channel and a display mode generated by operations of a remote terminal carried out by the user. The control unit 51 outputs a variety of control signals to a controlled assembly 58 comprising the components 46 to 49 described above in accordance with the various kinds of information received by the remote control receiving unit 52. It should be noted that the variety of control signals which are not shown in the figure are required in operations of the components 46 to 49 composing the controlled assembly 58.

FIG. 26 is a block diagram showing a typical configuration of a second embodiment wherein the present invention is applied to a television receiver. The second embodiment is best suited for an operation to display a picture by adopting an interlaced scanning technique. The present embodiment is implemented by adding a PI conversion unit 53 to the configuration of the first embodiment shown in FIG. 25 and replacing the sequential display unit 50 of the first embodiment with an interlace display unit 54 for displaying a picture by adopting the interlaced scanning technique.

The PI conversion unit 53 carries out a thinning process with a ratio of 2:1 on a signal series of the sequential scanning in order to perform signal processing to convert the signal series of the sequential scanning into a signal series of the interlaced scanning. The interlace display unit 54 displays a picture by adopting the interlaced scanning technique with a frame frequency of 60 Hz, 75 Hz or 100 Hz.

It should be noted that, since the other components carry out the same operations as those employed in the first embodiment shown in FIG. 25, their explanation is not repeated.

According to the embodiments described above, it is possible to implement a television receiver that is capable of keeping up with multi-source signals and offers a high picture quality at a low cost.

Industrial Applicability

The present invention can be applied to a variety of frame count transformation apparatuses for carrying out transformation of a television signal from the PAL system into the NTSC system, transformation of a television signal from a frame frequency of 50 Hz into a frame frequency of 60 Hz, 75 Hz or 100 Hz, transformation of a film picture from a frame frequency of 24 Hz or 30 Hz into 60 Hz and transformation of a television signal into a PC picture signal, providing a remarkable effect of picture quality improvement and cost reduction. To put it concretely, the frame count transformation method for transforming the number of frames of a picture signal and the frame count conversion apparatus adopting the method provided by the present invention can be applied to information handling home equipment such as a television receiver, a DVD player, a personal computer and a PAD terminal.

What is claimed is:

1. A frame count transformation method comprising the steps of:

detecting movement of a picture signal and searching for a block unit movement vector;

correcting said block unit movement vector in dependence on the magnitude of a movement correction error component of said block unit movement vector;

generating a movement vector selected on the basis of an error component between a movement correction signal of a current frame and a movement correction signal of an immediately preceding frame calculated by using said corrected block unit movement vector as a pixel unit movement vector; and generating a movement correction interpolation frame signal in dependence on the magnitude of an error component between a movement correction signal of a current frame and a movement correction signal of an immediately preceding frame calculated by using said pixel unit movement vector.

2. A frame count transformation method according to claim 1 characterized in that movement of a picture signal is detected by using a picture signal series of interlaced scanning.

3. A frame count transformation method according to claim 1 characterized in that movement of a picture signal is detected by using a picture signal series of sequential scanning.

4. A frame count transformation method according to claim 1 characterized in that the step of searching for a block unit movement vector comprises the substeps of:

selecting one of movement vectors of reference blocks set in advance with a smallest predicted error component as a representative movement vector; and calculating a predicted error in block matching processing to search for a block unit movement vector if said predicted error component of said representative movement vector is smaller than a threshold value, or using search mode information to search for a block unit movement vector if said predicted error component of said representative movement vector is equal to or greater than said threshold value.

5. A frame count transformation method according to claim 1 characterized in that, if said movement correction error for said block unit movement vector is smaller than a threshold value, said step of correcting said block unit movement vector is not executed and, if said movement correction error for said block unit movement vector is equal to or greater than said threshold value, on the other hand, said block unit movement vector is corrected by dividing a block associated with said block unit movement vector into miniblocks and selecting one of movement vectors of adjacent blocks with a smallest movement correction error computed for miniblocks thereof as a movement vector of said miniblocks.

6. A frame count transformation method according to claim 1 characterized in that said pixel unit movement vector is a movement vector with a smallest error component between a movement correction signal of a current frame and a movement correction signal of an immediately preceding frame computed by using said corrected block unit movement vector.

7. A frame count transformation method according to claim 1 characterized in that, in case a scene change of said picture signal is detected, said step of searching for a block unit movement vector, said step of generating a pixel unit movement vector and said step of generating a movement correction interpolation frame are halted and a signal of an interpolation frame is generated from a signal of current frame or a signal of an immediately preceding frame.

8. A frame count transformation apparatus comprising:
a block unit movement vector searching unit for detecting movement vector required in movement correction signal processing as a block unit movement vector;
a movement vector correcting unit for correcting said block unit movement vector in dependence on the magnitude of a movement correction error component of said block unit movement vector;
a pixel unit movement vector generating unit for generating a movement vector selected on the basis of an error component between a movement correction signal of a current frame and a movement correction signal of an immediately preceding frame calculated by using said corrected block unit movement vector as a pixel unit movement vector; and
a movement correction interpolation frame signal generating unit for generating a movement correction interpolation frame signal in dependence on the magnitude of an error component between a movement correction signal of a current frame and a movement correction signal of an immediately preceding frame calculated by using said pixel unit movement vector.

9. A frame count transformation apparatus according to claim 8 characterized in that said block unit movement vector searching unit detects a movement vector by carrying out block matching processing based on a plurality of representative movement vectors sparsely set in advance in a circumferential area and densely set in an area in close proximity to an origin for a moving picture block.

10. A frame count transformation apparatus according to claim 8 characterized in that said block unit movement vector searching unit detects a movement vector by carrying out block matching processing in a set search mode selected among a plurality of different search modes in accordance with a state of distribution of frequencies at which detected movement vectors are generated.

11. A frame count transformation apparatus according to claim 8 characterized in that said block unit movement vector searching unit has a vector transformation unit for transforming movement vectors of P and B pictures of movement vector information included in an input picture signal into a movement vector between 2 consecutive frames and, for a moving picture block, said block unit movement vector searching unit detects a movement vector on the basis of a movement vector output by said vector transformation unit.

12. A frame count transformation apparatus according to claim 8 characterized in that said block unit movement vector searching unit sets a search area with a width in the horizontal direction greater than a height in the vertical direction in a search of movement vectors based on block matching processing.

13. A frame count transformation apparatus according to claim 8 characterized in that said block unit movement vector searching unit carries out block matching processing by using a luminance signal component of a picture signal.

14. A frame count transformation apparatus according to claim 8 characterized In that said block unit movement vector searching unit carries out block matching processing by using a luminance signal component and a chrominance signal component of a picture signal.

15. A frame count transformation apparatus according to claim 8 characterized in that said movement correction interpolation frame signal generating unit carries out signal processing of a movement correction interpolation frame for a frame including special movement in accordance with a state of distribution of frequencies at which detected movement vectors are generated.

16. A frame count transformation apparatus according to claim 8 characterized in that said movement correction interpolation frame signal generating unit computes a value of an error performance function and an error component between a movement correction frame signal of a current frame and a movement correction frame signal of an immediately preceding frame by using a luminance signal component of a picture signal.

17. A frame count transformation apparatus according to claim 8 characterized in that said movement correction interpolation frame signal generating unit computes a value of an error performance function and an error component between a movement correction frame signal of a current frame and a movement correction frame signal of an immediately preceding frame by using a luminance signal component and a chrominance signal component of a picture signal.

18. An information handling home apparatus comprising:
an input unit for inputting a picture signal;
a frame count transformation unit for carrying out transformation processing on the number of frames of said picture signal by adoption of a frame count transformation method comprising:
detecting movement of a picture signal and searching for a-block unit movement vector;
correcting said block unit movement vector in dependence on the magnitude of a movement correction error component of said block unit movement vector;
generating a movement vector selected on the basis of an error component between a movement correction signal of a current frame and a movement correction signal of an immediately preceding frame calculated by using said corrected block unit movement vector as a pixel unit movement vector; and generating a movement correction interpolation frame signal in dependence on the magnitude of an error component between a movement correction signal of a current frame and a movement correction signal of an immediately preceding frame calculated by using said pixel unit movement vector; and a display unit for displaying an output of said frame count transformation unit.

19. An information handling home apparatus according to claim 18 characterized in that said frame count transformation unit for carrying out transformation processing on the number of frames of a picture signal converts said picture signal into a picture signal of sequential scanning in order to generate an interpolation frame of said picture signal by carrying out interlaced—to—sequential scanning transformation processing and displays said picture signal of sequential scanning on said display unit.

20. An information handling home apparatus according to claim 18 characterized in that said frame count transformation unit for carrying out transformation processing on the number of frames of a picture signal converts said picture signal into a picture signal of sequential scanning in order to generate an interpolation frame of said picture signal by carrying out interlaced—to—sequential scanning transformation processing, whereas a scanning transformation unit provided between said frame count transformation unit and said display unit converts said picture signal of sequential scanning into a picture signal of interlaced scanning and displays said picture signal of interlaced scanning on said display unit.

* * * * *